United States Patent
Froggatt et al.

(10) Patent No.: US 8,400,620 B2
(45) Date of Patent: Mar. 19, 2013

(54) REGISTRATION OF AN EXTENDED REFERENCE FOR PARAMETER MEASUREMENT IN AN OPTICAL SENSING SYSTEM

(75) Inventors: Mark E. Froggatt, Blacksburg, VA (US); Justin W. Klein, Blacksburg, VA (US); Dawn K. Gifford, Blacksburg, VA (US); Matthew Reaves, Christiansburg, VA (US); Joseph J. Bos, Christiansburg, VA (US); Alexander K. Sang, Christiansburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 113 days.

(21) Appl. No.: 13/149,206

(22) Filed: May 31, 2011

(65) Prior Publication Data
US 2011/0317148 A1   Dec. 29, 2011

Related U.S. Application Data

(60) Provisional application No. 61/350,343, filed on Jun. 1, 2010, provisional application No. 61/434,174, filed on Jan. 19, 2011.

(51) Int. Cl.
G01L 1/24 (2006.01)
G01B 11/16 (2006.01)
G01B 9/02 (2006.01)
(52) U.S. Cl. .................. 356/35.5; 356/32; 356/477
(58) Field of Classification Search ........... 356/32–35.5, 356/477, 479, 497
See application file for complete search history.

(56) References Cited

U.S. PATENT DOCUMENTS

| | | | |
|---|---|---|---|
| 4,761,073 A | 8/1988 | Meltz et al. |
| 5,798,521 A | 8/1998 | Froggatt |
| 6,141,098 A | 10/2000 | Sawatari et al. |
| 6,545,760 B1 | 4/2003 | Froggatt et al. |
| 6,856,400 B1 | 2/2005 | Froggatt |
| 7,042,573 B2 | 5/2006 | Froggatt |
| 7,330,245 B2 | 2/2008 | Froggatt |
| 7,440,087 B2 | 10/2008 | Froggatt et al. |
| 7,538,883 B2 | 5/2009 | Froggatt |
| 7,772,541 B2 | 8/2010 | Froggatt et al. |

OTHER PUBLICATIONS

International Search Report and Written opinion mailed Feb. 9, 2012 in corresponding Application No. PCT/US2011/038512.
Froggatt et al., "Distributed Measurement of Static Strain in an Optical fiber with Multiple Bragg Gratings at Nominally Equal Wavelengths," Applied Optics, vol. 27, No. 10, Apr. 1, 1998.
U.S. Appl. No. 12/874,901, filed Sep. 2, 2010; Inventor: Froggatt et.al.
U.S. Appl. No. 13/233,577, filed Sep. 15, 2011; Inventor: Froggatt et.al.

*Primary Examiner* — Kara E Geisel
*Assistant Examiner* — Hina F Ayub
(74) *Attorney, Agent, or Firm* — Nixon & Vanderhye P.C.

(57) ABSTRACT

An interferometric measurement system measures a parameter using at least one optical waveguide. A memory stores reference interferometric pattern data associated with a segment of the optical waveguide. Interferometric detection circuitry detects and stores measurement interferometric pattern data associated with the segment of the optical waveguide during a measurement operation. A spectral range of the reference interferometric pattern of the optical waveguide is greater than a spectral range of the measurement interferometric pattern of the optical waveguide. A processor shifts one or both of the measurement interferometric pattern data and the reference interferometric pattern data relative to the other to obtain a match and to use the match to measure the parameter. An example parameter is strain.

35 Claims, 18 Drawing Sheets

REGISTRATION OF AN EXTENDED REFERENCE FOR PARAMETER MEASUREMENT IN AN OPTICAL SENSING SYSTEM

PRIORITY APPLICATIONS

This application claims priority from U.S. provisional patent application Ser. No. 61/350,343, filed on Jun. 1, 2010, and on U.S. provisional patent application Ser. No. 61/434,175, filed on Jan. 19, 2011, the contents of both of which are incorporated herein by reference.

TECHNICAL FIELD

The technology relates to interferometric measurements and applications thereof.

INTRODUCTION

Optical strain sensing is a technology useful for measuring physical deformation of a waveguide caused by, for example, the change in tension, compression, or temperature of an optical fiber. Optical fiber strain sensing with fiber Bragg gratings uses a spectral shift induced by a strain on the fiber as a basic measurement technique. The shift in the Bragg spectrum is a result of the elongation or compression of the period of the periodic modulation of index that forms the Bragg grating. Strain is thus encoded onto wavelength and read out using a spectrometer. Froggatt and Moore, "High spatial resolution distributed strain measurement in optical fiber using Rayleigh scatter," Applied Optics, Apr. 1, 1998, and U.S. Pat. No. 6,545,760, "Apparatus and method for measuring strain in optical fibers using Rayleigh scatter," describe how to use an equivalent spectral shift of the random spectrum of the Rayleigh scatter in the fiber to measure strain. Significant advantages with using Rayleigh scatter instead of Bragg gratings include cost and convenience since fibers all come with Rayleigh scatter present. The Rayleigh scatter strain measurement technique is based on the fact that a given optical fiber possesses a random, broadband scattering profile that is both unique and repeatable. Analogous to a series of fiber Bragg gratings, when strained, this spectral fingerprint of the scatter shifts in wavelength. When Bragg gratings are used as the sensing mechanism, all the possible reflection wavelengths must be measured because signal levels only exist at the reflection wavelength of the Bragg. Using Rayleigh scatter, where reflected signals are present at all wavelengths, opens up the possibility of decoupling the strain range over which the optical sensing system can operate from the scanning range of the light source of the optical measurement system.

In FIG. 1, $v_c$ represents the center frequency of the measurement spectral range, i.e., the range of optical frequencies that the light source was swept through during a measurement scan. In the bottom right graph, the fiber with Bragg gratings is shifted such that the signal is outside the measurement spectral range, and as a result, this particular measurement does not detect any signal. However, when considering Rayleigh scatter in the upper right graph, a signal is detected across the entire measurement spectral range. The baseline Rayleigh scatter pattern, in the upper left graph, is preserved but shifted as a result of strain, and the measurement captures a segment of this shifted pattern. The ability to measure a shifted version of the baseline Rayleigh scatter pattern regardless of applied strain offers an advantage over Bragg grating-based sensing techniques.

In sensing strain with Rayleigh scatter and with Bragg gratings, a cross-correlation may be used to determine a shift between the reflected spectrums of a baseline and strained measurement. The measured shift required to match the reflected spectrums can be directly scaled to a measure of strain. However, as depicted in FIG. 2, straining the waveguide reduces the commonality or correspondence between a reference pattern and a measurement pattern as points are shifted out of the spectral range of the measurement. As more uncommon points are compared, a reduction in the strength of the measured correlation is observed. As Rayleigh scatter is generally a weak (low level) signal, the quality of a cross-correlation, (the amplitude of the correlation peak), degrades when sensing even low levels of strain. In an extreme case, a strain can be applied that entirely shifts all common points with a reference Rayleigh scatter pattern beyond the spectral range of the measurement rendering a cross-correlation approach ineffective.

Both Rayleigh scatter and Bragg grating-based strain sensing systems are further limited by physical deformation of the sensing waveguide before the measurement region of interest. Physical change in length of the sensing waveguide as a result of strain before the measurement region can accumulate and displaces a measurement segment of fiber. Without knowledge of the strain leading up to a measurement region, it is possible that the same physical segment of fiber is no longer being compared. A matching of a segment of fiber in physical distance is required to properly align the reflected spectrum of a measured segment with a baseline spectrum.

What is needed therefore is optical strain sensing technology that preferably enables sensing of high strains, maintains sufficient signal-to-noise levels in the presence of small strains, and achieves physical alignment without knowledge of the strain state of the sensing waveguide leading up to a measurement segment.

SUMMARY

The inventors overcame these problems and met this need and other needs by recognizing that a reference interferometric pattern may be recorded over an extended spectral range that is greater in optical frequency than that of a given interferometric measurement pattern. One example embodiment describes an interferometric measurement system for measuring a parameter using at least one optical waveguide. Non-limiting examples of optical waveguides include silica-based optical fiber, polymer-based optical fiber, and photonic integrated circuits. A memory stores reference interferometric pattern data associated with a segment of the optical waveguide. Interferometric detection circuitry detects and stores measurement interferometric pattern data associated with the segment of the optical waveguide during a measurement operation. A spectral range of the reference interferometric pattern of the optical waveguide is greater than a spectral range of the measurement interferometric pattern of the optical waveguide. Processing circuitry shifts one or both of the measurement interferometric pattern data and the reference interferometric pattern data relative to the other to obtain a match. The shift value at which a match is observed is then used to measure the parameter.

In a non-limiting example implementation, the apparatus corresponds to an optical strain sensing system configured to use Optical Frequency Domain Reflectometry (OFDR). OFDR produces a measure of the optical frequency response of a segment of the waveguide in the spectral domain and a measure of the locations of scattering events along the length of the segment in the temporal domain. The stored reference interferometric pattern data includes OFDR scatter pattern data in the spectral and/or temporal domains for the optical waveguide in a baseline state, and the processing circuitry compares a subsequent OFDR measurement of scatter pattern data in the spectral and/or temporal domains relative to the other to obtain a match. The shift value at which a match is observed is then scaled to measure the parameter.

In one example embodiment, the interferometric pattern data corresponds to a Rayleigh scatter pattern in the optical waveguide, the parameter corresponds to strain, and the processing circuitry determines a spectral shift in the spectral domain of the Rayleigh scatter in the optical waveguide segment to measure the strain.

In another example embodiment, a temporal shift in the temporal domain of the Rayleigh scatter in the optical waveguide is determined in order to measure change in length of the waveguide. One non-limiting example application is temperature sensing.

In a preferred example implementation, the reference segment data extends further in the spectral domain and the temporal domain than the measurement segment data. The shift of one or both of the measurement interferometric pattern data and the reference interferometric pattern data in the spectral domain allows a match to be detected even if the measurement interferometric pattern is shifted beyond a spectral range of measurement associated with the measurement operation. The shift of one or both of the measurement interferometric pattern data and the reference interferometric pattern data in the temporal domain allows a match to be detected even if the measurement segment is displaced in physical distance as a result of strain before the measurement segment.

In an example detailed implementation, a search algorithm is described which searches for a match of the measurement interferometric pattern data within the reference interferometric pattern data to achieve spectral and/or temporal registration between them. In general, a match may be an exact match, a closest match, or a matching value that exceeds a predetermined matching threshold. A processor determines a spectral and/or temporal shift for the match, and that determined spectral shift and/or temporal shift corresponds in one application to a strain applied to the segment. In the search algorithm, the processor incrementally shifts one or both of the measurement interferometric pattern data or the reference interferometric pattern data and compares the shifted measurement interferometric pattern data against the reference interferometric pattern data at each shift to produce a correlation quality value between the reference interferometric pattern data and the measurement interferometric pattern data.

Pattern data registration may be performed, for example, by systematically shifting the measurement interferometric pattern data or the reference interferometric pattern data in both a spectral domain and a temporal domain, performing a correlation with the measurement interferometric pattern data and the reference interferometric pattern data, and generating a quality factor based on the correlation at each shift. The processing circuitry multiplies the measurement interferometric pattern data or the reference interferometric pattern data by a phase slope in the temporal domain to shift the measurement interferometric pattern data or the reference interferometric pattern data in the spectral domain and multiplies the measurement interferometric pattern data or the reference interferometric pattern data by a phase slope in the spectral domain to shift the measurement interferometric pattern data or the reference interferometric pattern data in the temporal domain. The quality factor increases when an average difference between the reference interferometric pattern data and the measurement interferometric pattern data moves closer to zero. The processing circuitry selects a temporal shift and a spectral shift combination that produces a correlation associated with a highest quality factor.

The technology in this application also permits a reduction in the spectral range of the measurement segment to enable sensing of the parameter at a length along the optical waveguide on the order of or greater than 100 meters.

Another application of this technology uses the extended spectral range of the reference pattern data to prevent a reduction in signal-to-noise ratio that would otherwise occur when the measurement interferometric pattern data is shifted partially or beyond a spectral range of measurement for the segment.

Yet another application of this technology uses the technique of OFDR to produce a continuous measure of strain along a length of a waveguide. As a result of strain, scatters are physically shifted, and the respective OFDR measurement scatter pattern data signals are delayed in the temporal domain. A measured shift in delay corresponds to a continuous, slowly varying optical phase signal when compared against the reference scatter pattern data. The processing circuitry determines a derivative of the optical phase signal which corresponds to a change in physical length of the segment of the optical waveguide. The processing circuitry scales the change in physical length to produce a continuous measurement of strain along the optical waveguide.

The technology further includes an interferometric measurement method for measuring a parameter associated with at least one optical waveguide:

storing in a memory reference interferometric pattern data associated with a segment of the optical waveguide;

detecting measurement interferometric pattern data associated with the optical waveguide segment during a measurement operation, wherein a spectral range of the reference interferometric pattern of the optical waveguide is greater than a spectral range of the measurement interferometric pattern of the optical waveguide;

shifting by a computer one or both of the measurement interferometric pattern data and the reference interferometric pattern data relative to the other to obtain a match; and determining a measurement of the parameter based on the required shift value to obtain a match.

Another aspect of the technology is a non-transitory, computer-readable storage medium for use in an interferometric measurement system having an optical waveguide. The non-transitory, computer-readable storage medium stores a computer program comprising instructions that cause a computer-based OFDR system to perform the following tasks:

store in a memory reference interferometric pattern data associated with a segment of the optical waveguide;

detect measurement interferometric pattern data associated with the optical waveguide segment during a measurement operation, wherein a spectral range of the reference interferometric pattern of the optical waveguide is greater than a spectral range of the measurement interferometric pattern of the optical waveguide;

shift by a computer one or both of the measurement interferometric pattern data and the reference interferometric pattern data relative to the other to obtain a match; and determine a measurement of a parameter based on the required shift value to obtain a match.

DETAILED DESCRIPTION

Figure 1:
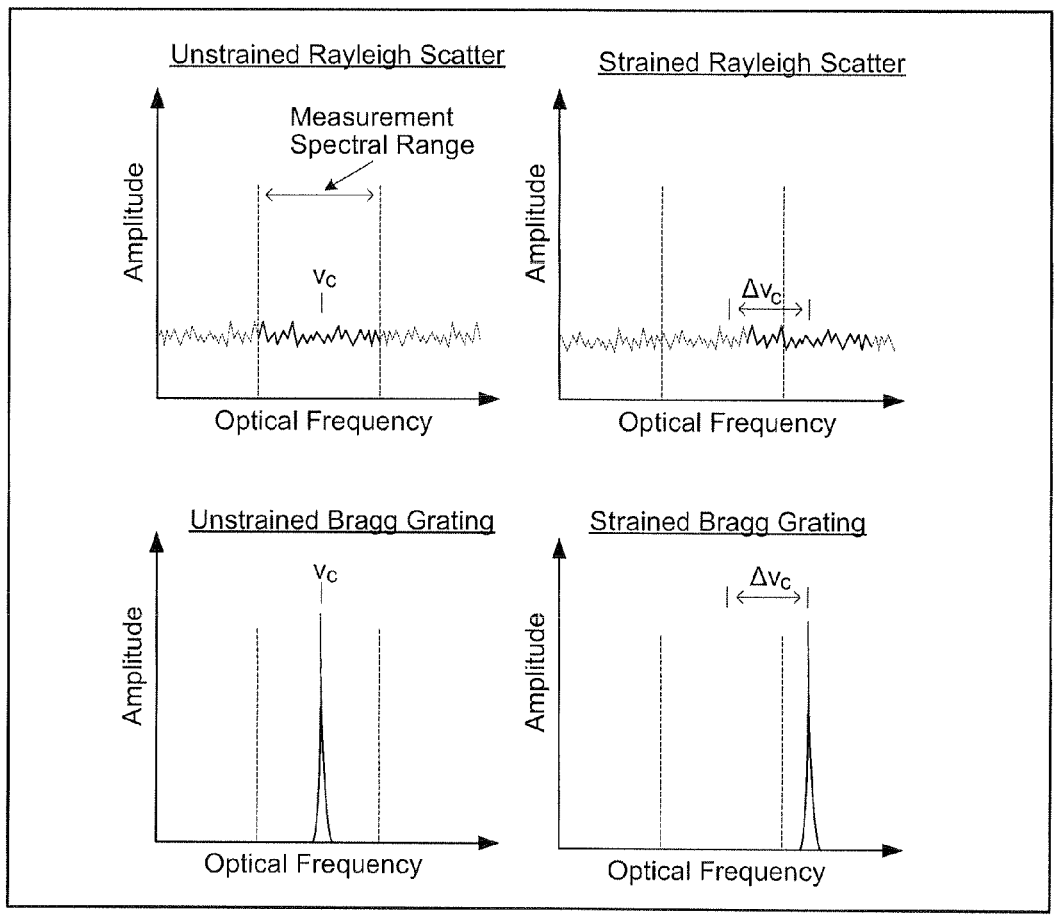
FIG. 1 shows graphs of examples of unstrained and strained Rayleigh scatter interferometric signals and unstrained and strained Bragg grating interferometric signals.
Figure 2:
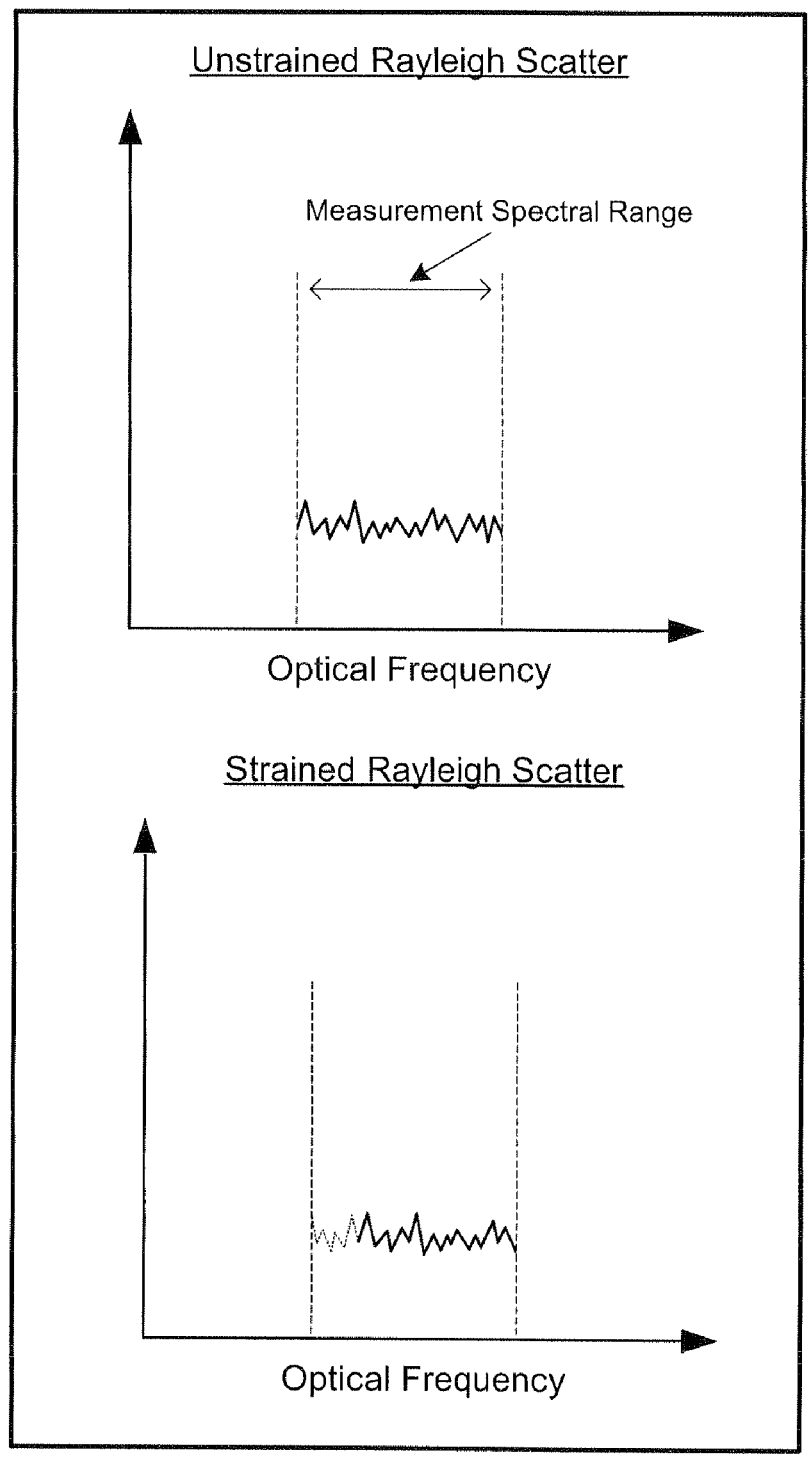
FIG. 2 shows graphs of examples of unstrained (reference) and strained (measurement) Rayleigh scatter interferometric signals.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The inventors overcame the problems identified in the background by recognizing that a reference interferometric pattern of an optical waveguide can be recorded over an extended spectral range, a range greater in optical frequency than that of a given interferometric measurement. Further, the reference interferometric pattern can be recorded to represent a larger length of the waveguide to accommodate physical displacement of the measurement segment as a result of strain. Limitations that prevent the proper measurement of higher strains on optical fibers are overcome by utilizing an extended reference interferometric pattern.

Figure 3:
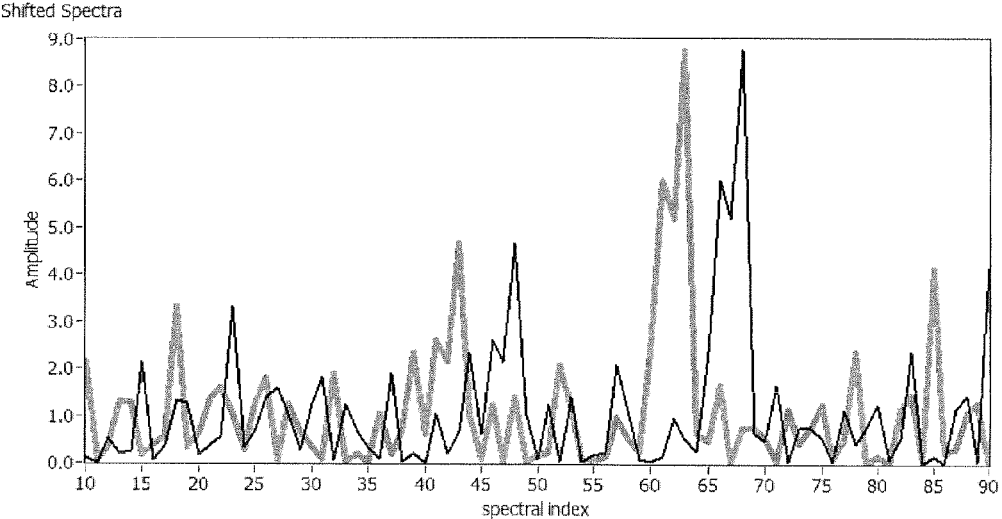
FIG. 3 is a graph showing an example of a shifted (measurement) and unshifted (reference) version of a continuous scatter pattern.

By implementing this technique, strain sensing technology gains valuable flexibility as it is no longer limited to a defined measurement scan range. Consider the example Rayleigh scatter patterns shown in FIG. 3. The figure contains a shifted (thin line) and an un-shifted (thick line) version of the same continuous Rayleigh scatter pattern. These two scatter patterns represent an example reference scatter data set and strained measurement scatter data set in which the spectral index on the horizontal axis represents an increment of optical frequency.

Figure 4:
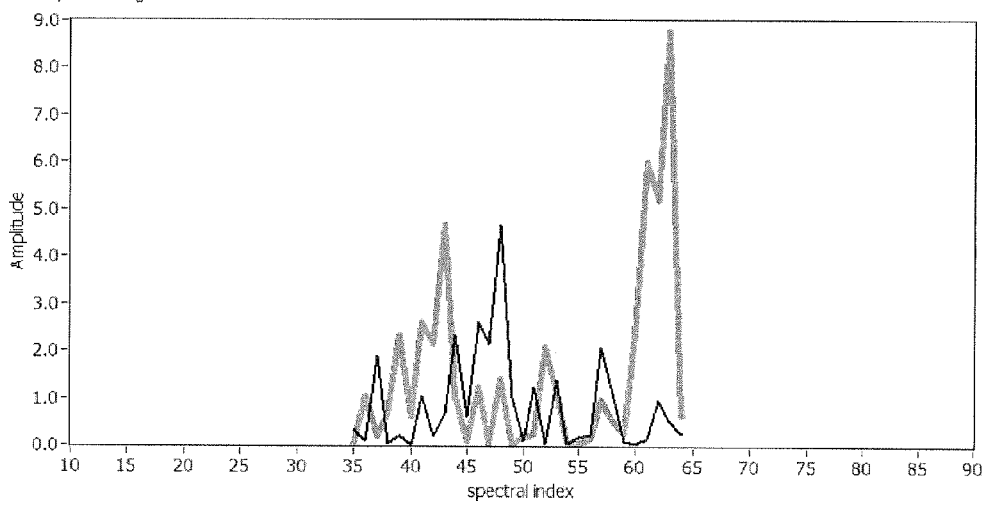
FIG. 4 is a graph showing an example of truncated versions of the shifted measurement pattern and the unshifted reference pattern.

Practical systems scan over a limited optical frequency range, and as a result, the reference and the measurement patterns are truncated in response to the spectral range of the measurement. FIG. 4 shows an example of two truncated scatter patterns that represent scanning over a limited wavelength range.

Figure 5:
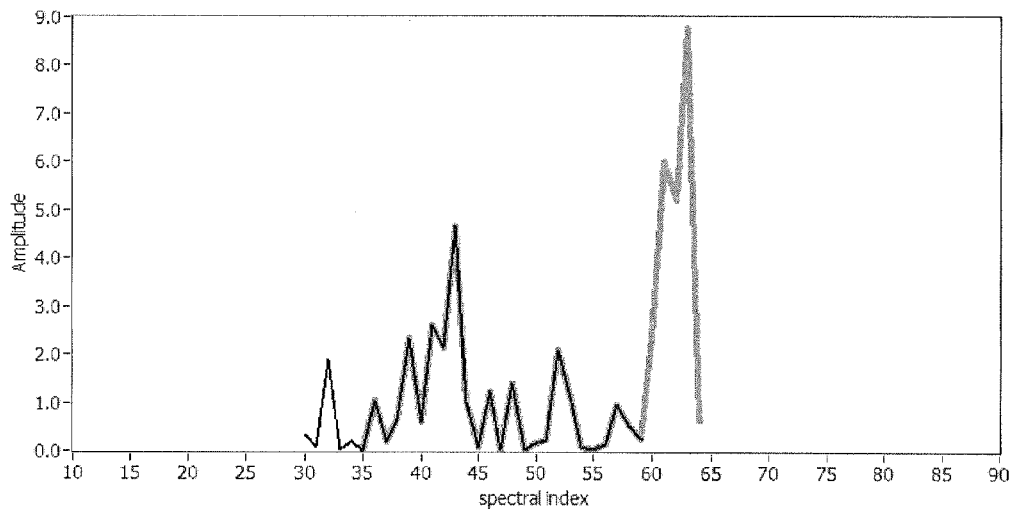
FIG. 5 is a graph showing an example of aligned reference and measurement scatter patterns depicting a reduced overlap region.

Due to the shift caused by fiber strain, these truncated scatter patterns no longer possess a 100 percent overlap as illustrated in the example in FIG. 5. If the patterns are shifted so that they once again overlap, the overlapping region (the dark portion of the line) possesses fewer points from spectral index 35 to 59, and the "wings" (indices 30-35 and 59-65) of each measurement do not have any matching points.

Figure 6:
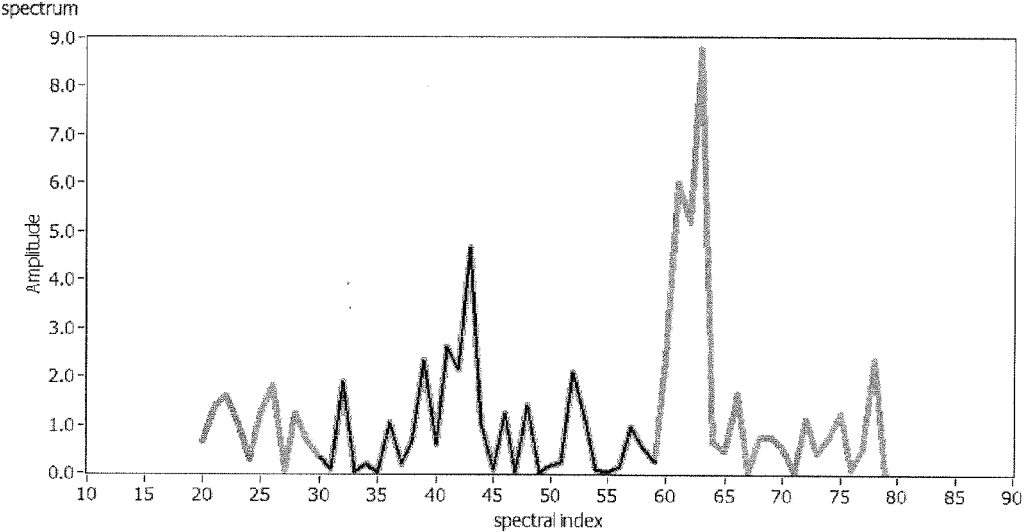
FIG. 6 is a graph showing an example of a reference scatter pattern with a spectral range greater than the spectral range of a measurement scatter pattern.

Strain applied to an optical fiber causes the interferometric measurement to lose correlation with the reference scatter pattern as fewer points are common between the patterns. As these patterns are compared to measure one or more parameters, this reduced correlation degrades measurement accuracy and may prevent the measurement of parameters altogether. This problem is overcome by recording or storing the reference interferometric scatter pattern for a predetermined fiber length over an extended spectral range. Since this stored reference scatter pattern data is static, the limitation of its spectral range is only defined by the tuning range of the acquisition system. FIG. 6 shows a reference scatter pattern (gray line) with a greater spectral range then the measurement interferometric scatter pattern (black line).

Figure 7:
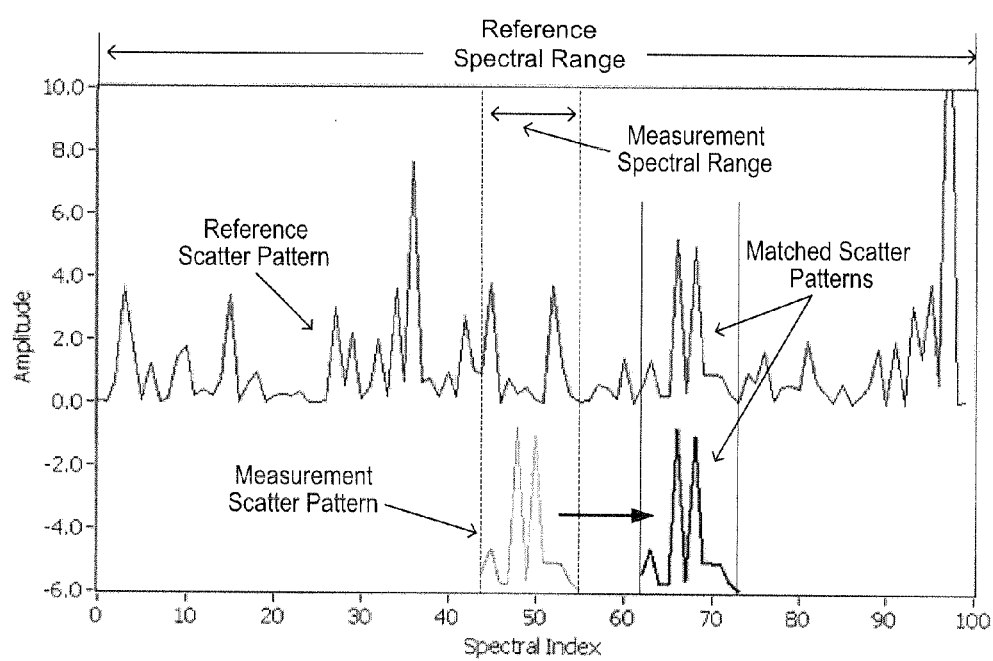
FIG. 7 is a graph showing an extended reference example where a measurement scatter pattern can be matched to a reference scatter pattern even in the case when the measurement scatter pattern is shifted because of a large strain beyond the spectral range of the measurement.

Implementing an extended reference allows a more comprehensive match to be determined between the reference spectrum and the measurement spectrum over a wider range of strains (shifts) with less signal degradation that would otherwise result because of decreased correlation. Further, a correlation can be performed in an extreme case of a baseline pattern being shifted entirely beyond the spectral range of the measurement. An example illustration of the extended reference is shown in FIG. 7 where the scatter pattern matching occurs beyond the measurement spectral range.

Correlating the measured interferometric scatter pattern with an extended reference interferometric scatter pattern, a shift in spectral index may be determined that aligns the measurement with a portion of the reference pattern. This shift in spectral index is proportional to a shift in optical frequency. Accordingly, determining the spectral shift required to find a pattern match within the reference pattern corresponds to determining the strain applied to the measured fiber. The act of searching for a match within a reference pattern is referred to as spectral registration. A match may include an exact match, a closest match, a match that exceeds some threshold, or other suitable matching criterion/criteria.

Thus, the optical frequency response of the fiber during a measurement, the measured spectrum, is searched against a reference pattern with a greater spectral range then the measurement until the patterns are registered or in alignment in accordance with suitable matching criterion/criteria. One example method is described as to how the measurement may be incrementally shifted and compared against the reference pattern at each shift to produce a measure of quality of correlation between the two data sets. Extending the spectral range in the reference pattern and quantifying alignment between the reference pattern data and measurement pattern data over a range of possible shifts provides an increased strain range for fiber optic shape sensing and a more robust strain sensing system than by using the measurement scan range alone. Further, with the maximum detectable strain being decoupled from the measurements spectral range, low cost-high speed systems can be designed that perform smaller wavelength scans reducing data size and light source requirements, such as tuning range.

Figure 8:
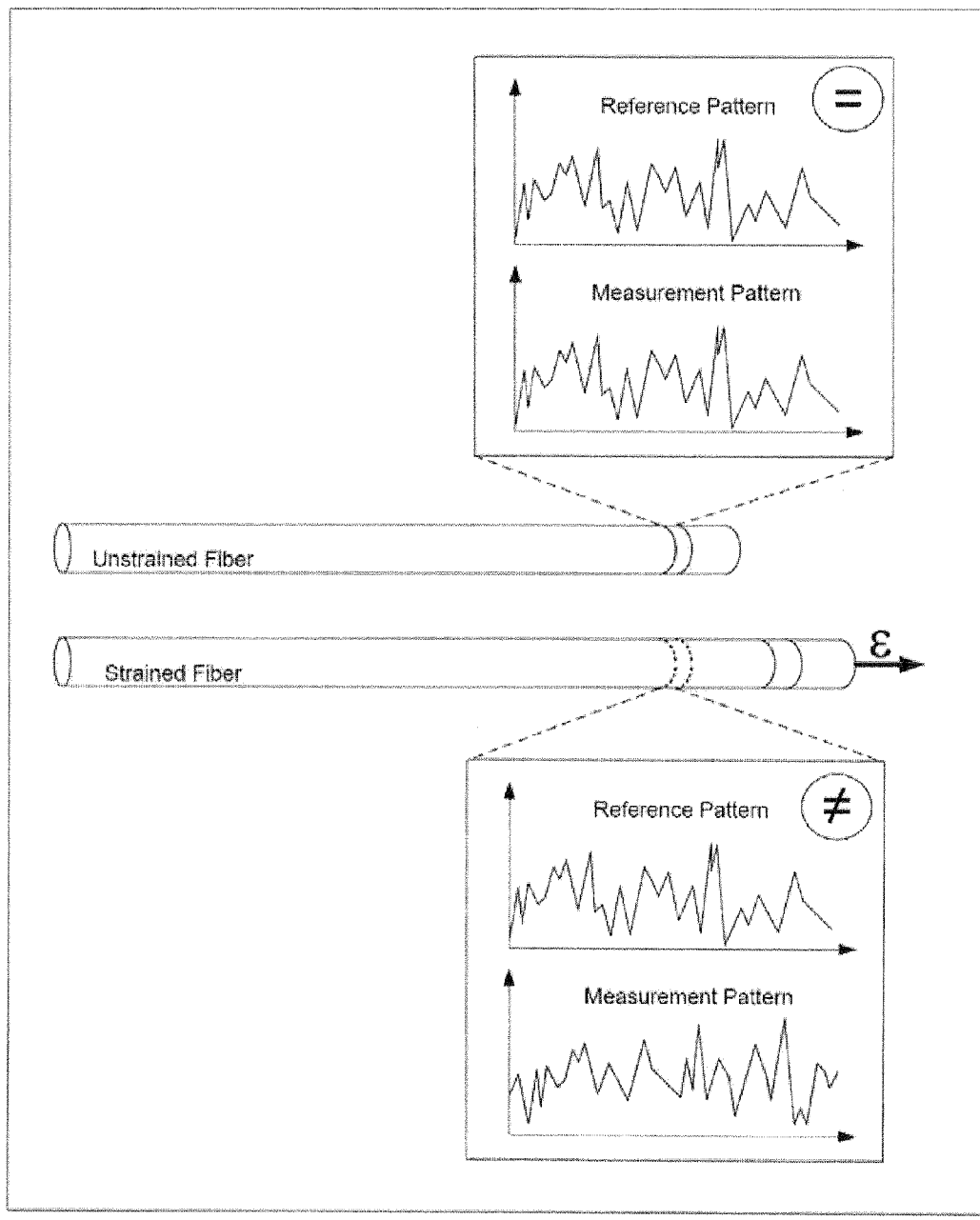
FIG. 8 shows an example where as an optical fiber is strained, a physical segment of fiber is shifted as the fiber is physically longer.

As an optical fiber is strained, the physical distance between the individual scattering events also increases. As scattering events are shifted outside the physical length that can be captured by a given measurement the spectral response begins to distort, and a correlation between a reference and measurement pattern begins to degrade in quality. In the extreme case, strain induced on the fiber leading up to the length being measured can entirely displace the segment of fiber originally being compared. If, for example, a fiber is strained at a constant 1,000 microstrain over 10 meters, that fiber is 10 millimeters longer than it was in the reference unstrained state. The scatter pattern that was located at 9 meters into the unstrained fiber is now located at 9.009 meters into the strained fiber. In this example shown in FIG. 8, the scatter patterns do not overlap because the same physical segment of fiber is no longer being compared. To improve correlation based measurements, registration in physical distance must also be maintained.

Therefore, a robust strain sensing system preferably obtains registration in physical distance without knowledge of the strain state of the waveguide leading up to the measurement segment. A robust strain sensing system also preferably correlates reflected spectrums in the presence of high strain and detects physical displacement of a measurement segment of fiber due to expansion/compression of the fiber preceding the measurement segment. The concept of a reference extended in spectral range allowing correlation to be maintained when a reflected spectrum is shifted out of the spectral range of the measurement may be adapted to extend the reference in physical distance to accommodate physical displacement of a measurement segment.

Figure 9:
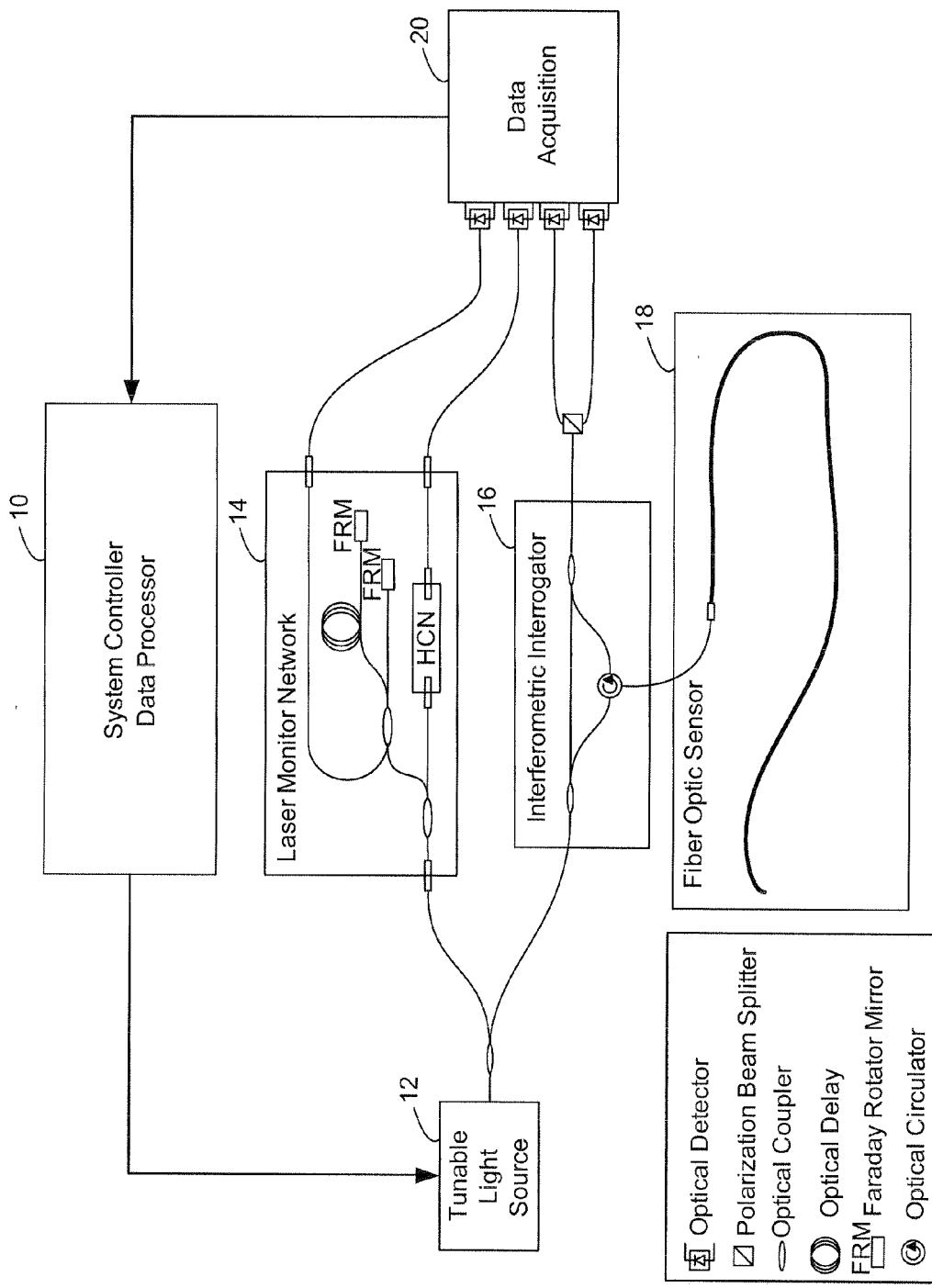
FIG. 9 is a non-limiting example of an OFDR-based fiber optic sensing system.

An example optical sensing system that uses the technique of Optical Frequency Domain Reflectometry (OFDR) is described that implements the concepts of an extended reference and registration to perform robust strain measurements. An is OFDR system can perform optical time domain measurements with high resolution and high sensitivity. FIG. 9 illustrates a non-limiting example of an OFDR-based distributed strain sensing system. A system controller 10 initiates a tunable light source 12, e.g., a tunable laser, to scan through a range of optical frequencies. Light enters the sensing or measurement fiber 18 through a measurement path of an interferometric interrogator 16. An interferometric interrogator 16 includes an optical circulator coupling the measurement fiber 18 to an input optical coupler and output optical coupler. A reference path extends between the input optical coupler and output optical coupler. Light scattered from the sensing fiber interferes with light that has traveled through the reference path. A laser monitor network 14 provides an absolute wavelength reference throughout the measurement scan using a gas cell, e.g., a hydrogen cyanide (HCN) gas cell. The laser monitor network 14 uses an interferometer to measure tuning rate variations throughout the scan. Data acquisition electronic circuitry 20 includes optical detectors, e.g., photodiodes, to convert measured optical signals to electrical signals. The system controller data processor 10 resamples the interference pattern from the measurement fiber using the laser monitor 14 outputs, also converted to electrical signals by corresponding optical detectors, to ensure the data are sampled with a constant increment of optical frequency. This resampling is required for the Fourier transform operation.

The system controller data processor 10 Fourier transforms the resampled sensing fiber signal to the temporal (time) domain and produces a complex signal of scatter amplitude and phase versus delay along the measurement fiber length. Using the distance light travels in a given increment of time based on the known speed of light, the delay may be converted to a measure of length along the sensing fiber. Thereafter, the scatter signal depicts each scattering event as a function of distance along the fiber. The sampling period is referred to as the spatial resolution and is inversely proportional to the frequency range that the tunable light source is swept through during the measurement. As the fiber is strained, the local "scatters" shift as the fiber changes in physical length. It can be shown that these strain-induced distortions are highly repeatable.

An OFDR measurement is valuable to the field of fiber optic strain sensing because it includes a wealth of information pertaining to the state of the optical fiber. In the temporal domain, the OFDR measurement signal describes the physical locations of the scattering events. Applying an inverse Fourier transform to that signal produces a measurement signal in the spectral domain that describes the optical frequency response of the fiber. Using the information from both transform domains allows measurement of a strain response by correlating the reflected spectrum with a reference pattern in the spectral domain and also allows measurement of physical displacement by correlating the scatter pattern with a reference pattern in the temporal domain.

As described earlier, the quality of the cross-correlation begins to degrade as points are shifted beyond the spectral range of a given measurement and as points are shifted beyond the physical range of the measurement. This example embodiment of OFDR strain sensing system overcomes this degradation by maintaining measurement registration in both the spectral and temporal domains. An extended reference enables one to maintain registration over a wider range of strain and/or displacements. In one example implementation, registration may be performed by systematically shifting a given measurement or reference in both the spectral and temporal domain and evaluating the quality of the correlation at each combination. A shift applied in either the temporal or spectral domain may be mathematically implemented by utilizing a property of the Fourier transform.

Delay in the frequency domain is a linear phase term in the time domain as depicted by Eq. 1, Eq. 2, and Eq. 3 in which t represents time and ω represents frequency.

$$F(\omega) = \int_{-\infty}^{\infty} f(t)e^{i\omega t}dt \quad \text{Eq. 1}$$

$$F(\omega + \Delta\omega) = \int_{-\infty}^{\infty} f(t)e^{i(\omega+\Delta\omega)t}dt \quad \text{Eq. 2}$$

$$F(\omega + \Delta\omega) = \int_{-\infty}^{\infty} e^{i\Delta\omega t} f(t)e^{i\omega t}dt \quad \text{Eq. 3}$$

Similarly, delay in the time domain is a linear phase term in the frequency domain as shown with Eq. 4, Eq. 5, and Eq. 6.

$$f(t) = \frac{1}{2\pi}\int_{-\infty}^{\infty} F(\omega)e^{-i\omega t}d\omega \quad \text{Eq. 4}$$

$$f(t+\Delta t) = \frac{1}{2\pi}\int_{-\infty}^{\infty} F(\omega)e^{-i\omega(t+\Delta t)}d\omega \quad \text{Eq. 5}$$

$$f(t+\Delta t) = \frac{1}{2\pi}\int_{-\infty}^{\infty} e^{-i\omega\Delta t}F(\omega)e^{-i\omega t}d\omega \quad \text{Eq. 6}$$

Figure 10:
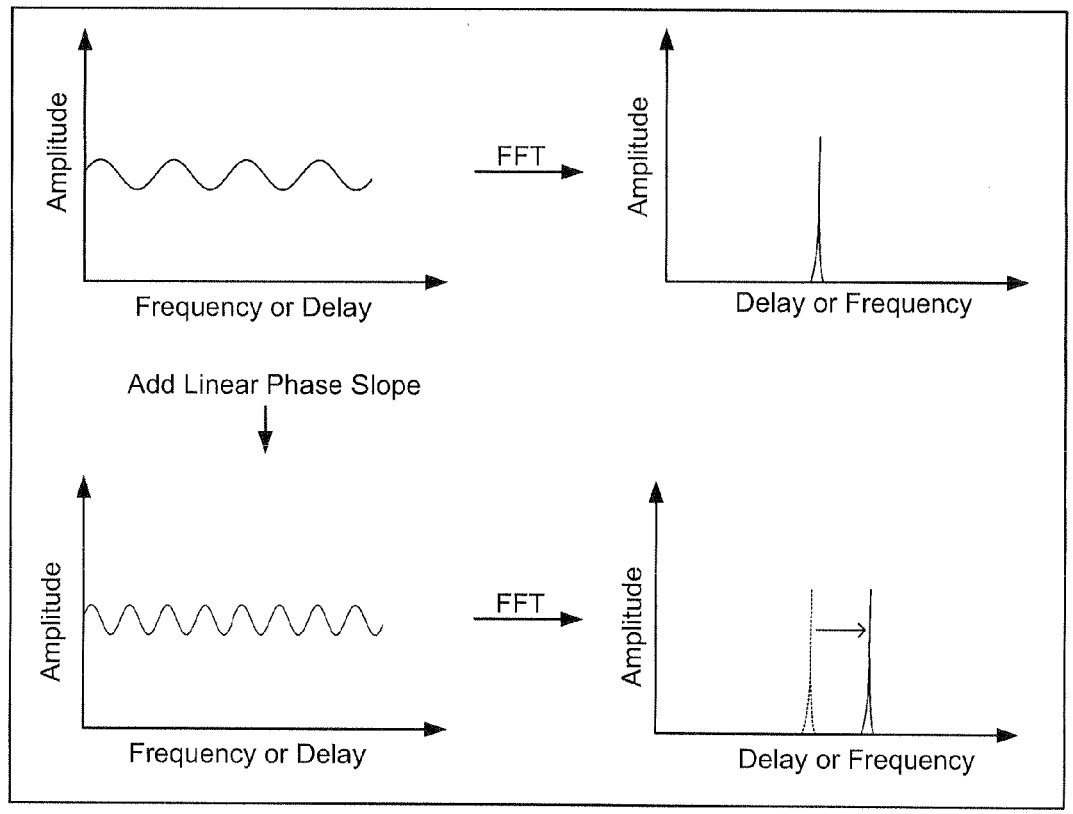
FIG. 10 shows example graphs that illustrate how a linear phase slope applied in one domain induces a shift in the transform domain.

As an example, consider the fact that the Fourier transform of a sine wave is a delta function. The amplitude of a simple sinusoid as a function of time is constant, and the phase versus time is linear. The slope of the phase in the original (time) domain determines the location of the delta function in the transform (spectral) domain. If a linear slope is added to the phase of the function in the time domain, it results in a shift of the location of the peak in the spectral domain. Considering the converse of this example, a linear slope applied to the phase of a sinusoid in the spectral domain results in a shift of its corresponding delta function in the temporal domain. This concept is illustrated in FIG. 10.

Figure 11:
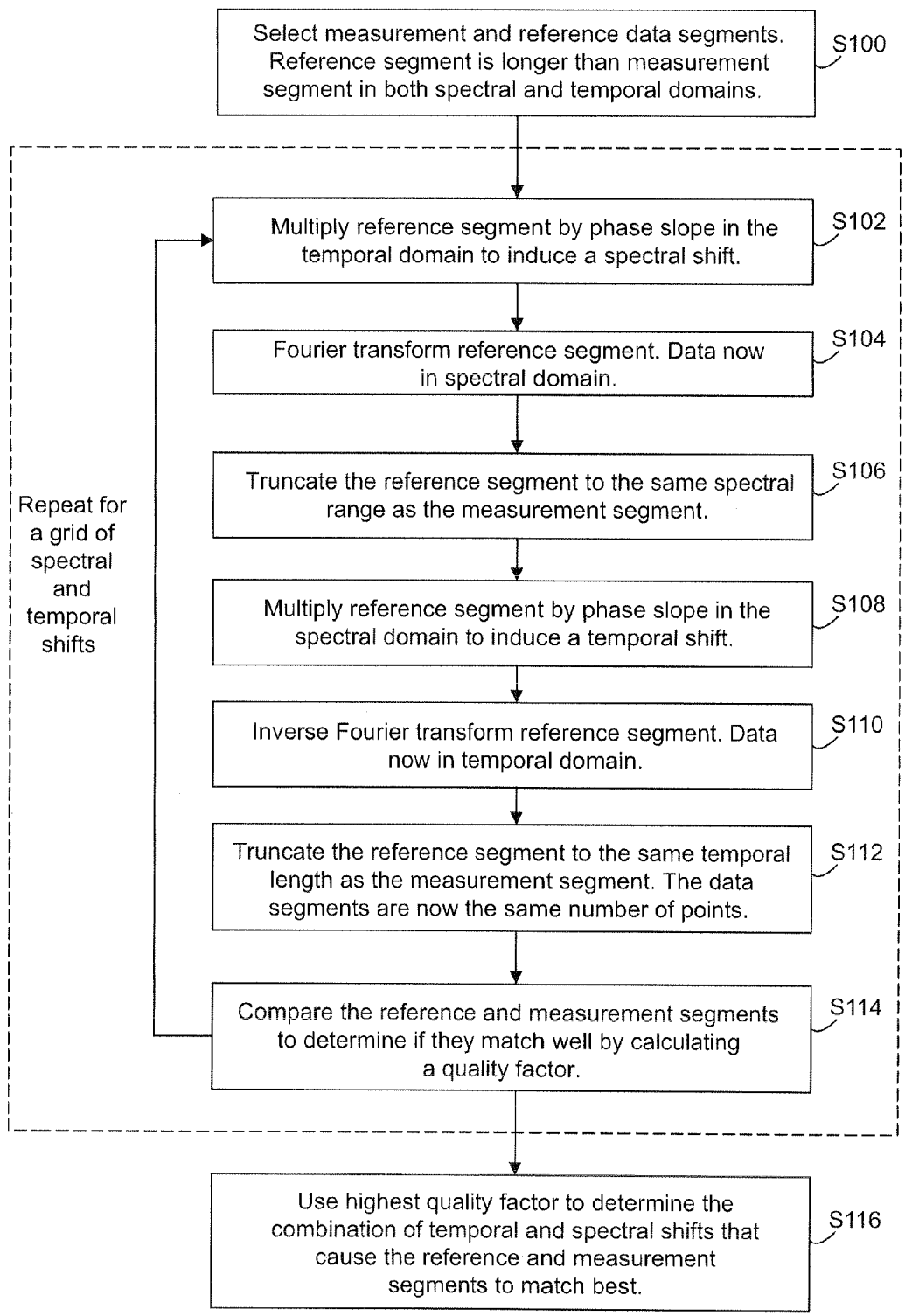
FIG. 11 is a flowchart of a non-limiting example procedure that searches for a quality of correlation over a range of temporal and spectral shifts.

Using this principle, a temporal shift and a spectral shift may be applied to the reference data and then compared to the measurement signal. By monitoring the quality of the correlation, a temporal shift and a spectral shift may be determined that result in a high quality correlation. The spectral shift is preferably equal to the optical frequency shift induced by the strain on the measurement and the displacement of the measurement segment in physical distance can be scaled from the found temporal shift. A flowchart outlining one non-limiting, example algorithm that searches a range of temporal and spectral shifts to assemble a grid that assesses correlation quality is shown in FIG. 11.

Segments in the reference and measurement data are selected, where the reference segment is larger than the measurement segment in both the temporal and spectral domains (step S100). In one non-limiting, example implementation, a 40 nanometer reference scan and a 5 nanometer measurement scan were selected. The reference segment is preferably sufficiently large to accommodate expected temporal shifts from the applied strain. For example, 1000 microstrain of tension applied over 1 meter of fiber leads to a 1 mm temporal shift by the end of the strained region. In this case, the reference segment is preferably at least 1 mm longer on each side than the measurement segment to allow for the desired data registration in this example.

Fourier transform theory dictates that multiplying a data set by a phase slope in one domain causes a shift in the data in the transform domain. In OFDR data sets, the temporal and spectral domains have a Fourier relationship. Applying a phase slope in the temporal domain causes a shift in the spectral domain and vice versa. In the example search process shown in FIG. 11, temporal and spectral shifts are applied to the reference by multiplying the data with phase slopes in both domains (step S102 for temporal domain and step S108 for spectral domain) for multiple loops (see the return from step S114 to step S102). The number of loops is determined both by the number of total index steps to search over and the number of fractional index steps. As a non-limiting example, a search over +/−10 indices with 5 fractional steps per index in the temporal domain might use [(10×5)×2] loops.

One spectral index shift is induced by multiplying the reference segment in the time domain by a phase slope that runs between −π and +π. The temporal reference segment is longer than the measurement segment, but the slope is calculated to run between −π and +π over the length equivalent to the length of the measurement segment. For example, if the measurement segment represents a 2 mm region in the fiber, and a reference segment 4 times longer than the measurement length is used to account for temporal shifts, the reference segment is 8 mm long. However, the phase slope in the time domain is calculated such that it runs from −π it to +π over the 2 mm in the center of the data to induce a single index spectral shift. This avoids changing the applied spectral shift when the reference segment length is changed.

The data is then transformed into the spectral domain using an FFT (step S103) and then truncated in the spectral domain such that the reference data covers the same spectral range as the measurement data (step S106). For a 40 nanometer reference and a 2.5 nanometer measurement example, the reference data might be truncated to 1/16 of its original size in the center of the data. After this truncation, the reference data is still larger than the measurement data by the amount of extra points selected in the temporal domain. One temporal index shift is induced by multiplying the reference data by a phase slope running between −π and +π in the spectral domain over the remaining data size (step S108). There is no need to adjust for extra points as the data has been truncated to the same spectral range as the measurement data.

The resulting data is then transformed back to the temporal domain using an inverse Fourier transform (step S110) and then truncated in the center of the time domain to the same length as the measurement segment (step S112). The two data sets are now equal in length in both the temporal and spectral domains and have the same number of points. The next step is to evaluate how closely the reference and measurement data sets match in the comparison step S114 using an overlap quality factor.

In this non-limiting example, the following sets of equations are implemented to quantify the similarity (correlation) between the two data sets. First, a correction is applied to the reference data set to compensate for constant phase and amplitude offsets between the measurement and reference data sets that may occur scan to scan. A phase correction is calculated by averaging the complex phase difference between the reference and measurement scans according to Eq. 7.

$$\bar{\varphi} = \angle(\Sigma z_{meas} z_{ref}^*)]$$ Eq. 7

An average amplitude ratio is then calculated based on the reference and measurement according to Eq. 8.

$$\bar{a} = \sqrt{\frac{\Sigma|z_{meas}|^2}{\Sigma|z_{ref}|^2}}$$ Eq. 8

A correction factor can then be assembled with these two quantities and applied to the reference data as seen in Eq. 9.

$$z_{ref,corr} = z_{ref} \bar{a} e^{i\bar{\varphi}}$$ Eq. 9

An overlap quality factor is quantified using the following criteria described in Eq. 10.

$$Q = \frac{1}{\Sigma|(z_{ref,corr} - z_{meas})^2|}$$ Eq. 10

The overlap quality factor increases when the average difference between the complex reference data and the measurement data set moves closer to zero. This subtraction of complex numbers is one way to evaluate the similarity of both the real and imaginary components. The flowchart in FIG. 11 may be used to produce a lookup table in which a range of temporal shifts are crossed with a range of spectral shifts. By selecting the temporal and spectral shift combination that produces the highest quality factor, (step S116), the induced temporal and spectral shifts imposed on that particular measurement segment when compared with the reference data may be determined. This routine in FIG. 11 may be run along the length of a fiber to determine a measure of both strain verses length (spectral shift) and change in length of the waveguide (temporal shift).

Figure 12:
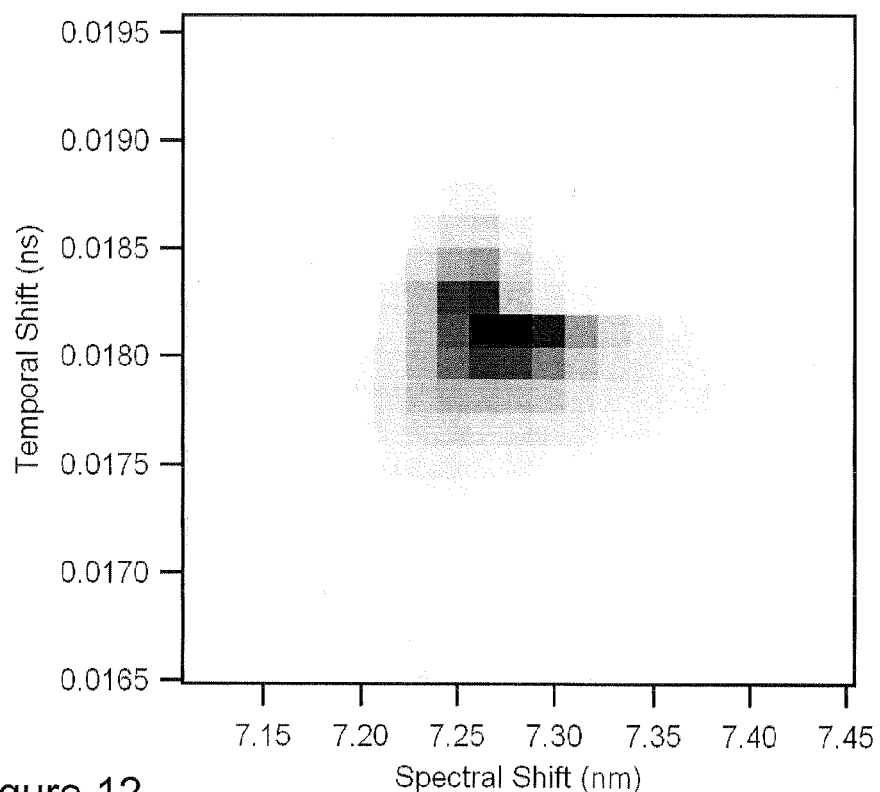
FIG. 12 shows a non-limiting, example of a grid plot representing quality of correlation over a range of spectral and temporal shifts applied to a reference data set.

FIG. 12 depicts an example of the overlap quality factor calculation over a grid of spectral and temporal shifts. The gray scale indicates how well the reference and measurement match, with black being a high quality factor. Black indicates a strong correlation while white represents a weak correlation strength.

Figure 13:
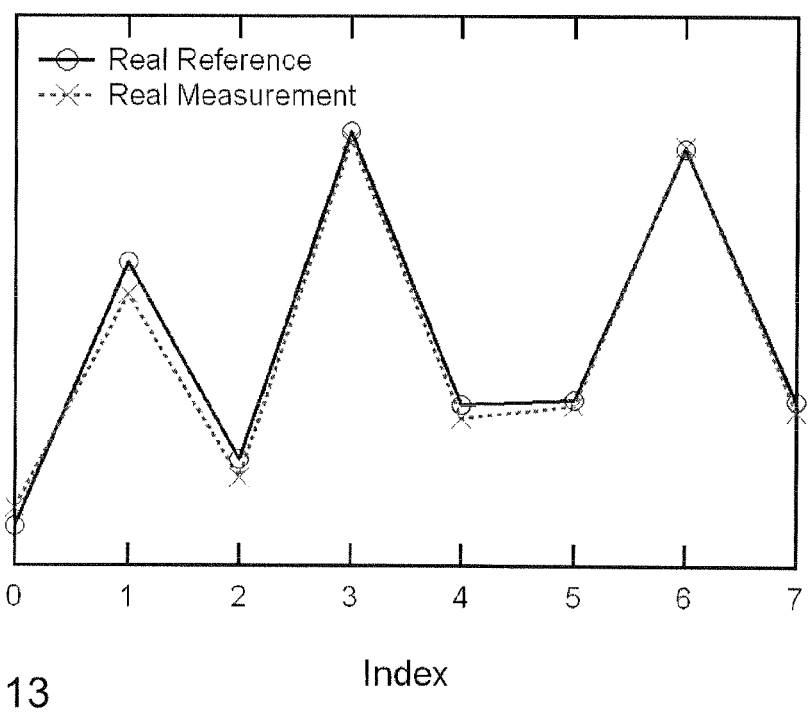
FIG. 13 shows a non-limiting, example comparing the real component of complex reference scatter pattern data and of measurement scatter pattern data in the spectral domain.
Figure 14:
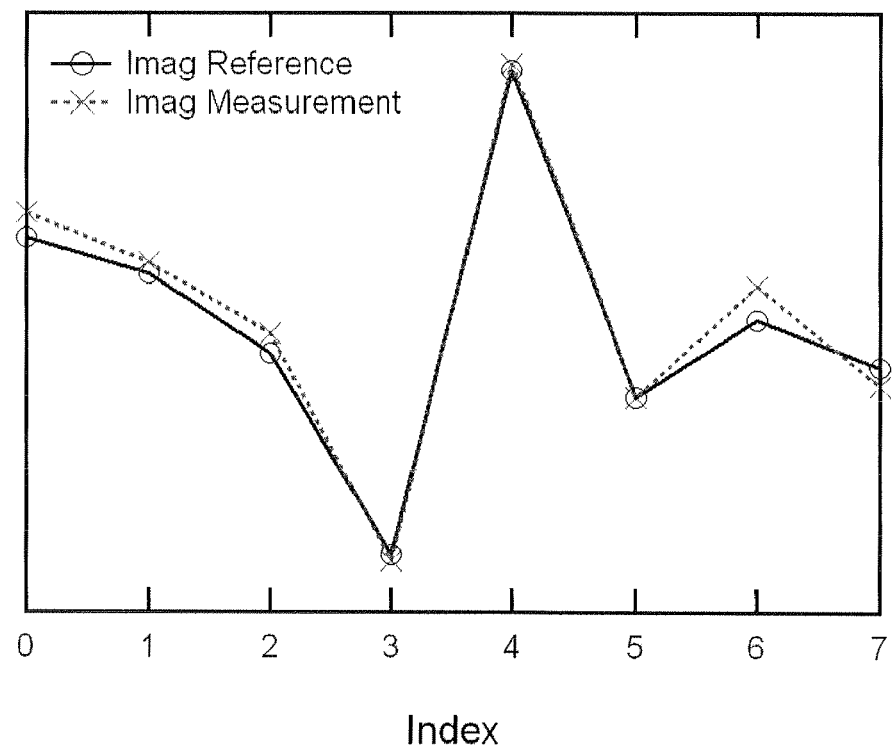
FIG. 14 shows a non-limiting, example comparing the imaginary component of complex reference scatter pattern data and of measurement scatter pattern data in the spectral domain.

The degree to which the reference scatter pattern and measurement scatter pattern match may be determined based on a similarity between the real and imaginary components of these complex scatter patterns. In FIGS. 13 and 14, the real and imaginary components, respectively, of the reference scatter pattern data and measurement scatter pattern data are compared in the spectral domain to illustrate the similarity in the data when the spectral and temporal shifts are applied to the reference scatter pattern data corresponding to the highest quality correlation.

The algorithm outlined in FIG. 11 may be stepped along the length of strained optical fiber to measure both temporal shift and spectral shift verses distance along the length of the fiber. Both quantities may be scaled to a measure of strain along is the length of the fiber offering a robust algorithm for strain sensing.

Figure 15:
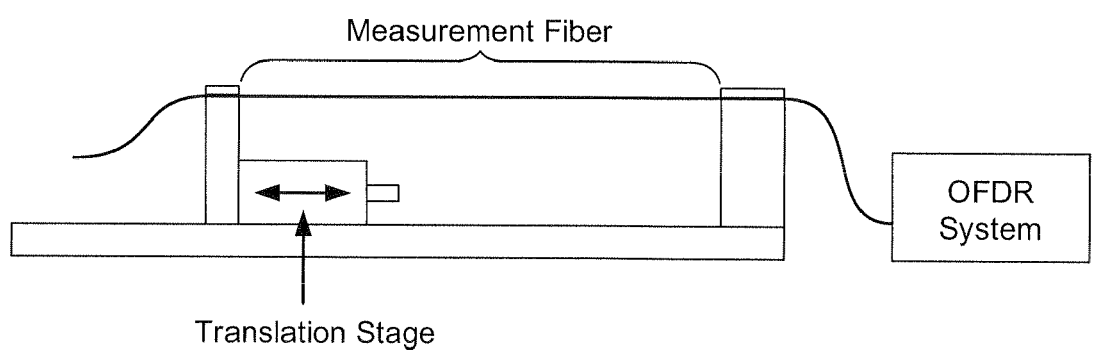
FIG. 15 is a non-limiting example test configuration.

To further demonstrate the technology described above, consider the following test conducted by the inventors. A reference pattern for an optical fiber was recorded in an unstrained state using an OFDR based acquisition system for a spectral range of 40 nanometers. The optical fiber was then axially strained using a setup depicted in FIG. 15. The axial load applied to the fiber was increased to a strain of 6000 microstrain. A measurement was recorded with a spectral range of 5 nanometers. Six thousand microstrain induces a wavelength shift of approximately 7.2 nanometers at a center wavelength of 1540 nanometers in standard SMF28 optical fiber. Thus, the spectrum of the measurement is expected to be shifted beyond the 5 nanometer spectral range of the measurement. Conventional cross-correlation approaches using a reference and measurement pattern matched in with a spectral range of 5 nm are ineffective in this situation because all data points are shifted out of the spectral range of the measurement and no common points exist between the two datasets.

Figure 16:
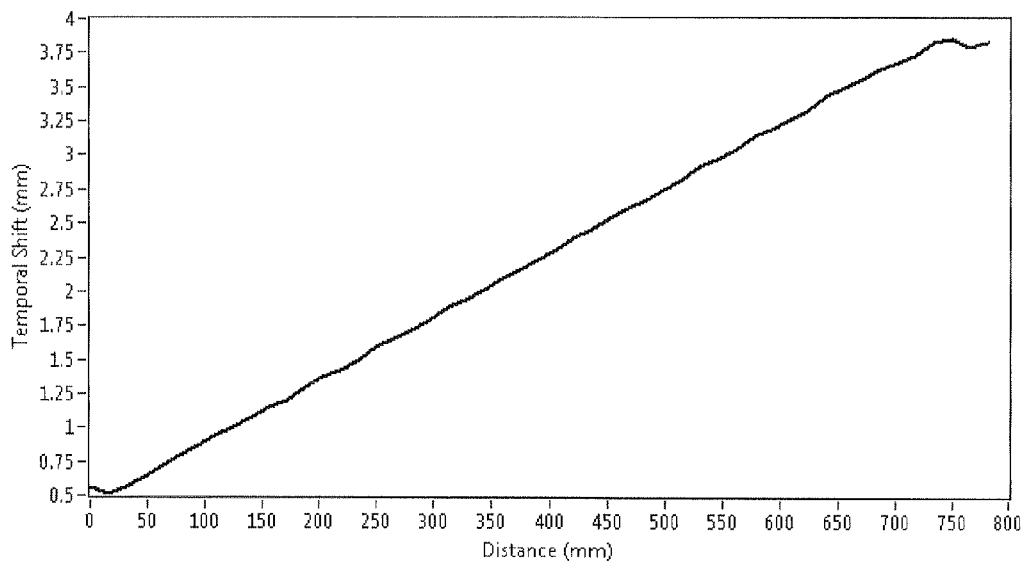
FIG. 16 is a graph showing an example of temporal displacement due to the increase in physical length of the optical fiber.

The temporal and spectral registration algorithm outlined in FIG. 11 was executed along the length of the optical fiber strained by the test setup, and data was processed in 15 mm steps along the length of the strained fiber. At each 15 mm step, the resulting search grid was evaluated to determine the combination of spectral and temporal shift with the highest quality factor. The determined temporal shift was scaled to a measure of fiber length change verse distance along the strained fiber and is shown in FIG. 16.

Figure 17:
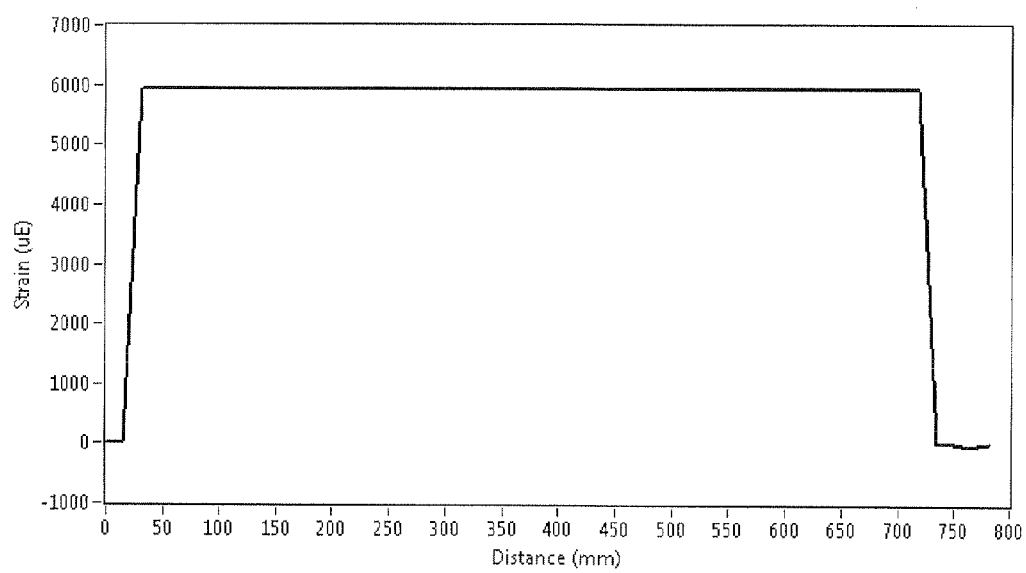
FIG. 17 is an example of strain produced from a spectral shift search procedure.

Axial strain is illustrated in FIG. 17 and was calculated by scaling the spectral shift found along the length of the optical fiber using the registration algorithm. As expected, the strain is evenly distributed along the length of the optical fiber between the attachment points of the apparatus and quickly falls to zero strain after these attachment points.

The 40 nanometer reference pattern enabled a measurement of both temporal displacement and spectral shift along the length of the highly-strained fiber. The applied strain was sufficient to induce a spectral shift that fully displaced the measurement outside of its spectral range. Further a substantial physical deformation of over 3 millimeters was induced over the 700 millimeter length of fiber. This physical deformation also decreases the effectiveness of the standard cross-correlation approach. However, using extended reference and the registration algorithm significantly increased the measurable strain range and effectiveness of optical strain sensing.

The extended reference technology described above may be used in many applications in which acquisition scan range is limited. As a non-limiting example, long range applications, in which measurement segment lengths exceed 100 meters, benefit greatly from this technology. In OFDR systems, measurement range (fiber length) is directly proportional to the spatial resolution of the measurement. In other words, for a constant number of acquired points, a lower spectral resolution allows a greater length of optical fiber to be measured. But as demonstrated and explained above, the maximum strain that can be measured is directly proportional to the scanned wavelength range. Thus, using standard reference methods, a large number of data samples would need to be acquired in order to obtain a long-range, high strain measurement. This presents a significant data transfer and processing burden, and also increases the necessary time for each scan. However, using an extended reference method for strain measurements, one can store a single reference scatter pattern over an extended spectral range, and subsequent measurement scans can be taken over a much smaller spectral range. In this way, field measurements can be taken quickly, and only a small number of acquired samples need be transferred for any given measurement.

Figure 18:
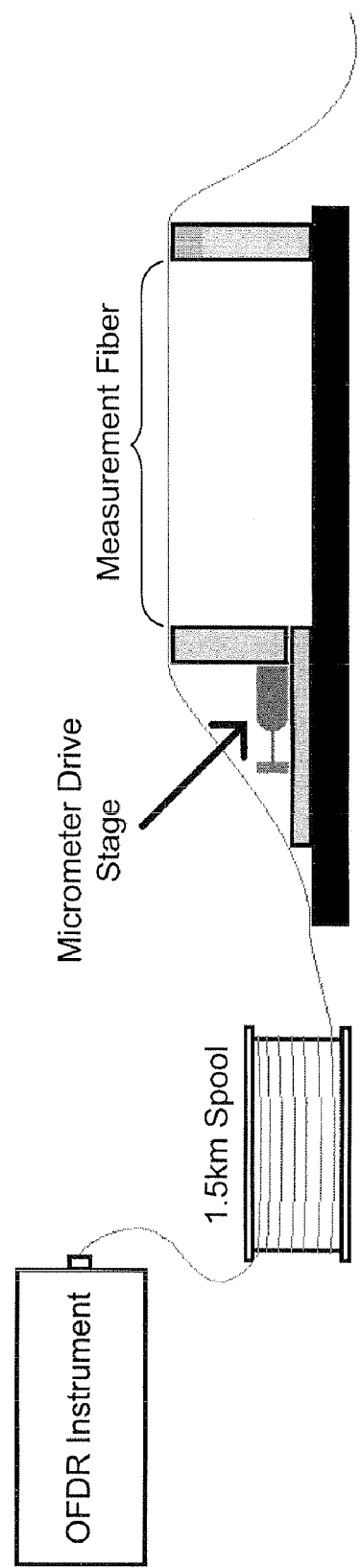
FIG. 18 shows an example strain measurement setup for a long range strain sensing system.

To illustrate the principle of strain sensing at long range, the inventors constructed a setup similar to what is illustrated in FIG. 18. The measurements were made with the fiber attached at the distal end of a 1.5 kilometer spool of fiber. In order to collect a Rayleigh scatter profile at this range, the scan range of the OFDR instrument was set to a wavelength range of 0.807 nanometers. Scans were taken with the fiber in several different strain configurations by adjusting a micrometer drive stage. To capture an extended reference, the 1.5 kilometer spool was removed from the setup, and a wider-range (in this non-limiting example, 21.18 nanometers) scan was taken of the 3 meter test fiber in an unstrained state. The Rayleigh scatter profile is a physical property of a given length of fiber. Hence, adding or removing the 1.5 kilometer spool does not change the measured scatter pattern of the 3 meter length of test fiber. The measurement and extended reference patterns of the fiber region-of-interest were then cross-correlated to obtain a strain-induced spectral shift for the various strain configurations. These calculations were then compared to a standard cross-correlation approach of which the reference and measurement patterns were both acquired at a common spectral range, in this non-limiting example case, 0.807 nanometers.

Figure 19:
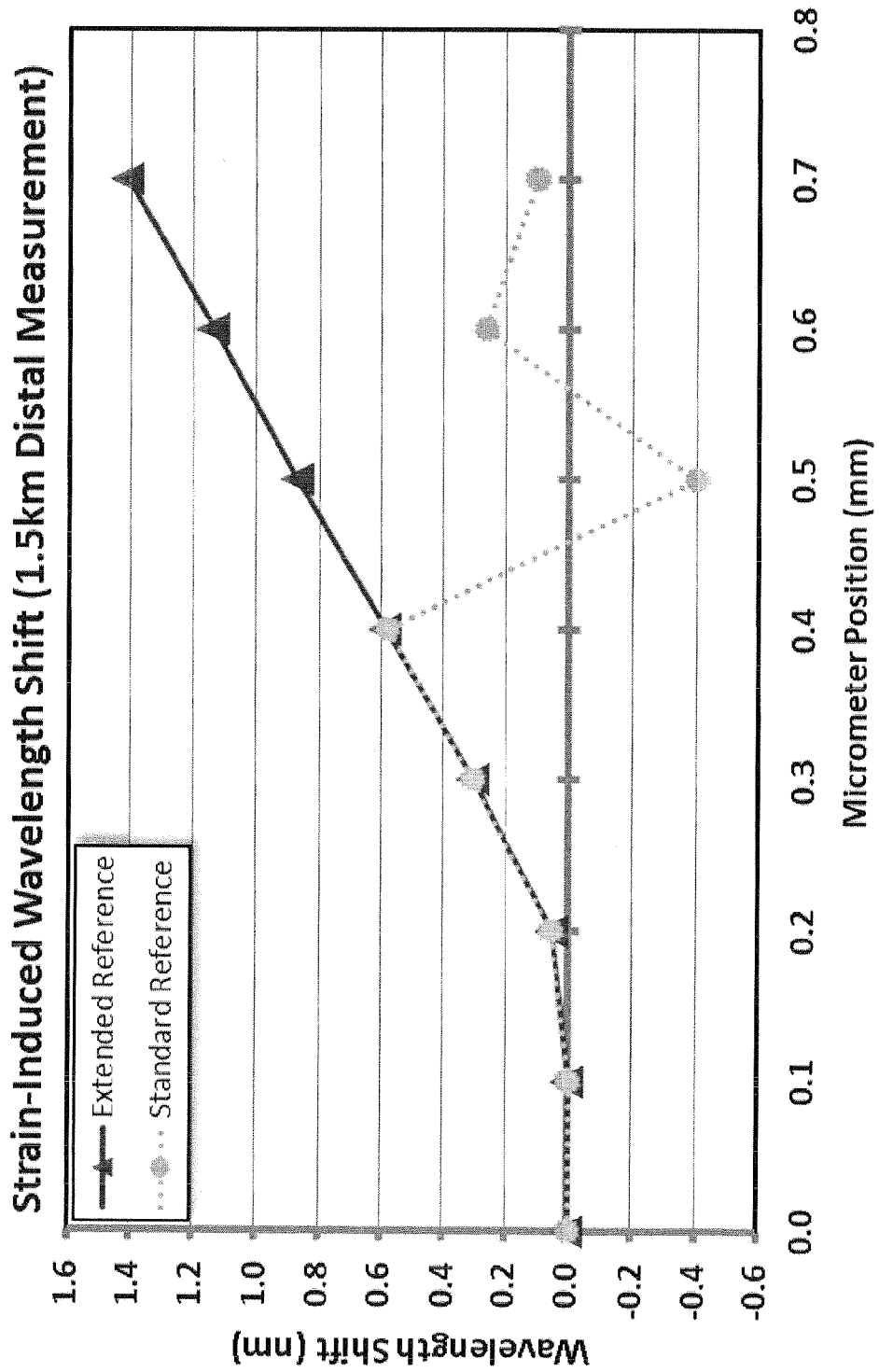
FIG. 19 is a graph showing an example of strain-induced wavelength shift calculated using both extended reference and standard reference for an example 1.5 kilometer strain sensing application.

The results are summarized in FIG. 19. The dotted gray curve shows strain calculations performed through a standard-reference method, using a 0.807 nanometer scan range for both the reference and measurement patterns. The standard-reference calculations break down around 0.5 nanometer wavelength shift as evidenced by the discontinuity of this line. The black solid curve depicts strain calculated using a 21.18 nanometer extended reference and maintains continuity far beyond the strain values tolerated with a standard reference. Further, the extended reference enables wavelength shifts that exceed the spectral range of the measurement scan, 0.807 nanometers.

Figure 20:
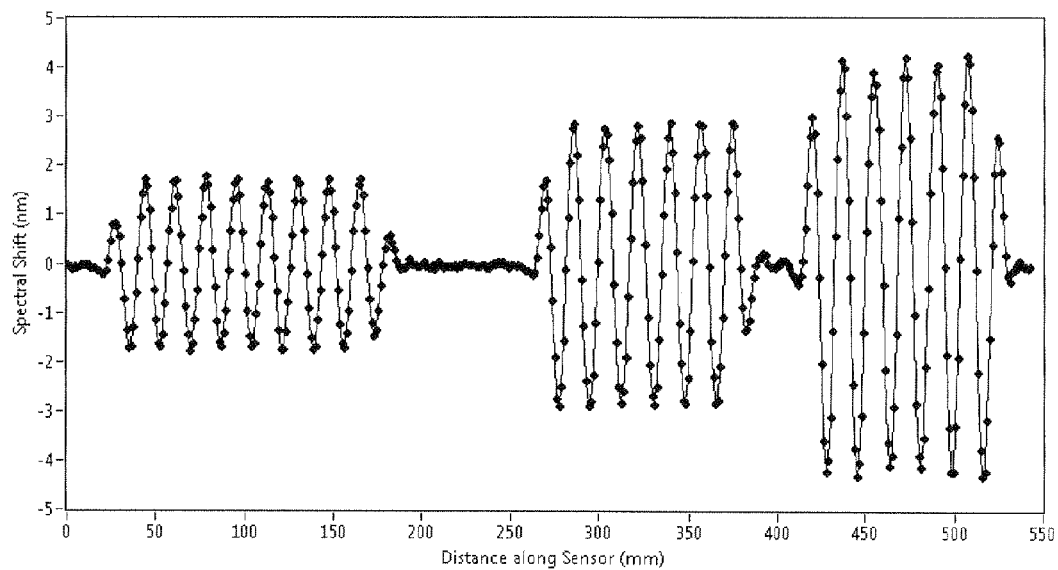
FIG. 20 is a graph showing an example of distributed strain profiles of a helically spun shape sensing fiber with a 25 mm loop, 15 mm loop, and a 10 mm loop as determined using a registration algorithm executed every 1.28 millimeters.

The extended reference-registration approach described above may also be used to provide more robust measurements of distributed strain than allowed by conventional cross-correlation approaches. When a strain profile varies along the length of a measurement segment, the cross-correlation signal is blurred as the period of the scatters is not constant. Although the size of the measurement segment might be decreased, cross-correlations are not effective operating on small sets of data. Furthermore, fast-changing distributed strains along the length of a fiber create a complicated temporal landscape as the physical distance between the scatters along the length of the fiber elongates or compresses with respect to the reference pattern. The example registration algorithm is well-suited for applications that require or desire measurement of fast changing distributed strains. As an example, the inventors placed an optical shape sensing fiber into several loops and executed the registration algorithm described in FIG. 11. A shape sensing fiber can be constructed with independent optical cores that are helically spun along the length of the sensing fiber. Hence, when is placed into a bend in a single plane, an outer core experiences periods of elongation and compression as it wraps about the shape sensing fibers central axis throughout the region of the bend. In FIG. 20, a fiber with optical core spacing of 35 microns and a helical period of 15 millimeters was placed into three loops of bend radius 25 millimeters, 15 millimeters, and 10 millimeters. The maximum strain experienced by a core is inversely proportional to the bend radius. For the 10 millimeter loop, the core experiences alternating compression and elongation resulting in significant spectral shift, on the order of 4 nanometers. This is a highly dynamic strain profile because the optical core experiences the elongation and compression in a period of 15 millimeters. Conventional approaches cannot effectively measure aggressive distributed strain profiles like that shown in FIG. 20.

Although the registration algorithm may be executed along the length of the fiber to produce a measure of strain along the length of the fiber, this does not produce a continuous measure of strain along the length of the sensing fiber because the algorithm is advanced in a stepped fashion. Even though the spatial resolution of the measurements may be increased by decreasing the step size, this becomes computationally expensive and does not ultimately produce a continuous measure of strain. In many distributed strain sensing applications, such as fiber optic position sensing, it is desirable to have a continuous measurement of strain to a high spatial resolution (<50 um). Optical phase tracking is a powerful option for distributed strain sensing which provides a high spatial resolution and, by the nature of the measurement, a continuous measure of strain.

The OFDR technique may be adapted to produce continuous measures of strain as a function of distance by adopting optical phase tracking as described in commonly-owned, U.S. patent application Ser. No. 12/874,901, filed on Sep. 2, 2010, entitled "Optical Position and/or Shape Sensing," incorporated herein by reference. Recall from FIG. 9 that performing an OFDR measurement provides a measure of scatter amplitude verse fiber distance. As the structure of an optic fiber is distorted by strain, the amplitudes of individual scattering events that comprise Rayleigh scatter are preserved. In other words, the scatter profile of the fiber can only be compressed or elongated. As the reflected light from a scattering event travels a different distance relative to its physical position in an unstrained fiber, there is a change in the optical phase of this reflected light. As optical phase is a continuous signal along the length of the fiber, phase change can be tracked continuously with the full spatial resolution of the measurement. This change in optical phase is directly proportional to the accumulated change in length. A derivative of this optical phase signal can be directly scaled to a continuous measure of strain.

Optical phase tracking has similar limitations to that of the cross-correlation approach and these limitations can be overcome through the use of the extended reference and the registration technology described above. Namely, the highest phase change that can be tracked is defined by the spectral range of the measurement. An extended reference allows extraction of a measure of phase change for a signal shifted beyond the spectral range of the measurement, thereby increasing the strain ranges that can be measured with the optical phase tracking technique. Temporal distortions, due to physical length change, also begin to degrade the phase signal. As shown above, strain measurements may be improved by registering (aligning) the reference and measurement in the temporal domain. Thus, the registration technology described above may be applied in another example embodiment to optical phase tracking to increase the quality of the optical phase signal tracked.

Figure 21:
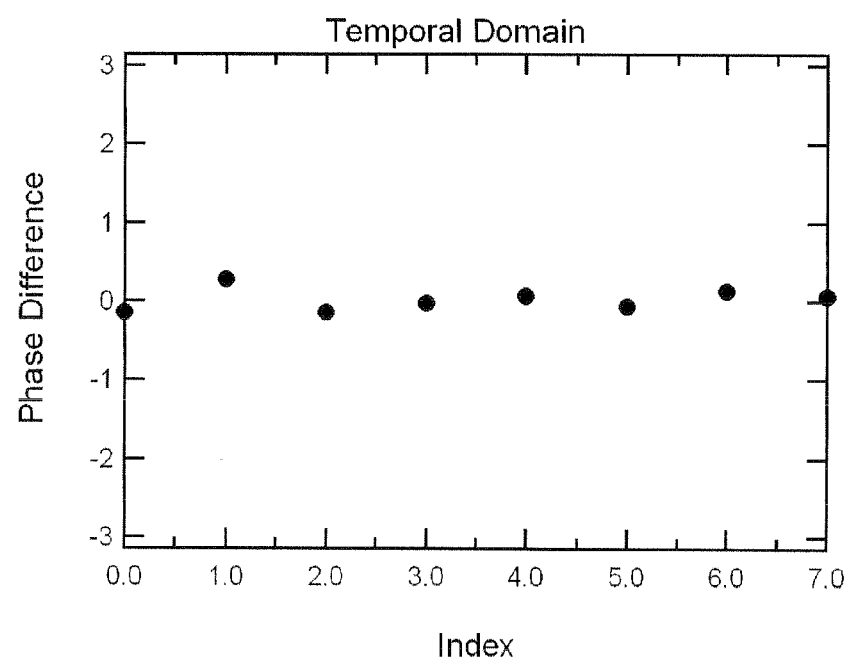
FIG. 21 is a graph showing an example of a phase difference found by extracting the argument from the product of the complex conjugate of the reference and measurement signals in the temporal domain.

OFDR data is complex-valued. A measure of phase may be extracted by conjugating the reference data and multiplying against the complex valued measurement data set. The angle of this complex number is equal to the optical phase accumulated as a result of physical change in length between the two datasets. When the correct temporal and spectral shifts are applied, the phase difference between the data sets verses length is a slowly varying function. A plot of the phase difference in the temporal domain between a reference and measurement data sets that have been registered is plotted in FIG. 21.

Figure 22:
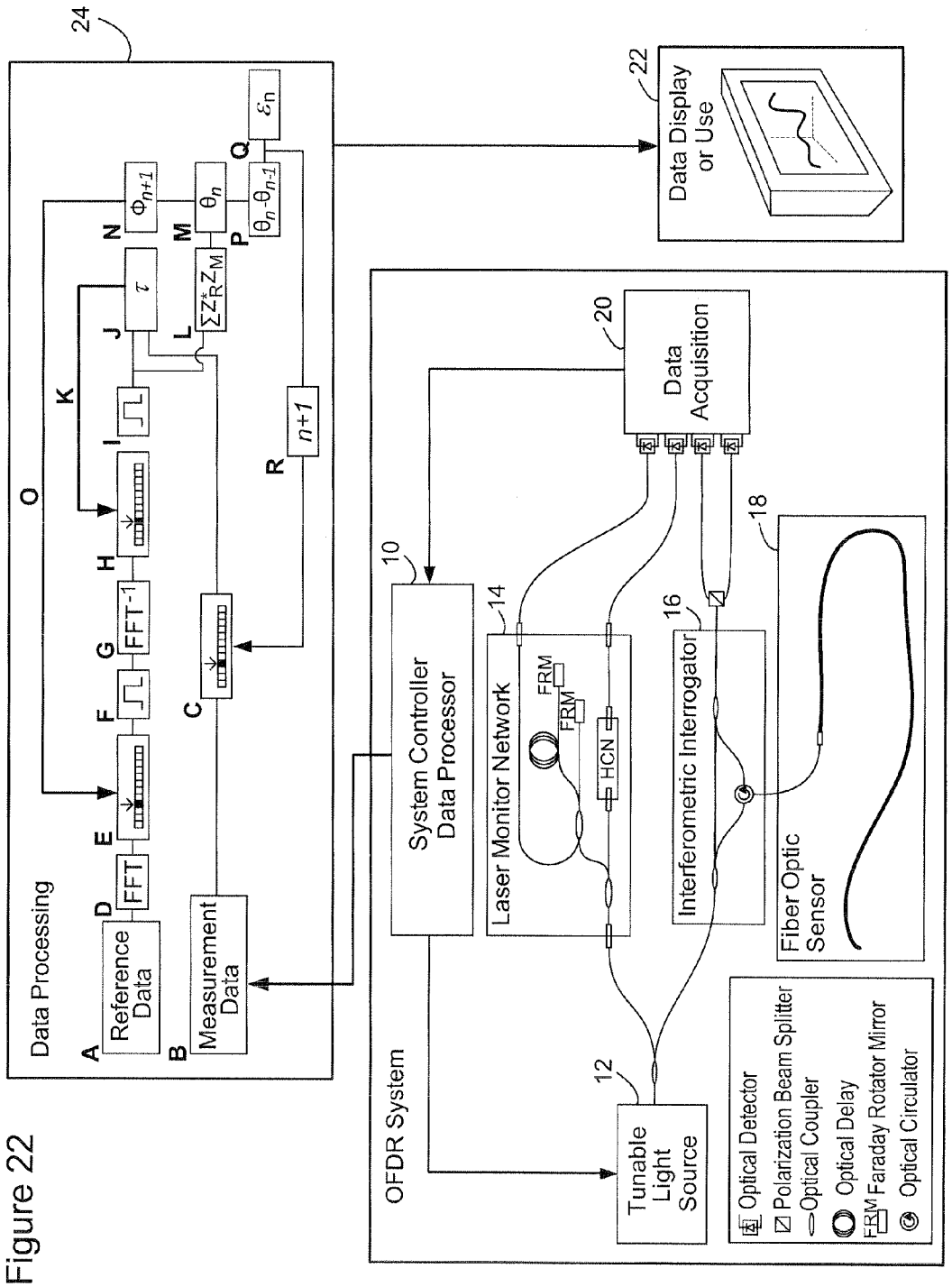
FIG. 22 is a function block diagram showing a non-limiting, example of optical phase tracking with an extended reference.

By registering the reference and measurement in both the temporal and spectral domains, a continuous, slowly varying signal of optical phase change can be extracted from the data sets. FIG. 22 is a non-limiting example function block diagram of an optical phase tracking system that uses the concept of maintaining registration in the temporal and spectral domains to increase the robustness of the phase tracking algorithm. Furthermore, the extended reference concept is also applied to increase the strain range that can be measured with the technique of optical phase tracking. The OFDR system is similar to that illustrated in FIG. 9. However, the system controller/processor 10 (or some other processor) performs the processing illustrated in block 22 and described below.

Reference data (A) in the temporal domain is retained in system memory (not shown) that is both longer in the temporal and spectral domains. Measurement data (B) in the temporal domain is processed to select a segment or window of data. The data segment window is advanced point by point (C) along the length of the fiber. The reference data in the temporal domain is Fourier (FFT) transformed (D) into the spectral domain and then indexed (E) such that it is aligned with the measurement data in the spectral domain. The reference data is then truncated (F) in the spectral domain such that it covers the same optical frequency range as the measurement data. An inverse Fourier transform (G) is performed on the truncated reference data in the spectral domain to return the data to the temporal domain. The reference data in the temporal domain is then indexed (H) so that it is temporally registered with the measurement data. The registered reference data in the temporal domain is then truncated (I) such that its temporal range matches that of the measurement segment. The reference and measurement segments are now equal in data size. The reference data segment and measurement data segment are then compared to assess how well they are temporally aligned (J). The output of this module is used as feedback (K) for the registration of the reference in the temporal domain as the registration algorithm is executed along the length of the fiber. A complex multiply is performed between the complex conjugate of the reference scatter pattern and the complex measurement scatter pattern, and the points of the data segment are averaged (L). A measure of optical phase is accumulated by extracting the angle of the averaged value (L) and summing the value with the previous optical phase value (M). The optical phase signal may be used to produce an approximation of the shift in optical frequency as a result of strain in the measurement segment (N). This quantity can be used as feedback to register the reference and measurement data in the spectral domain (O). The derivative of the optical phase signal will be proportional to the change in length between the measurement and reference scatter patterns along the length of the sensing fiber (P). This signal can be scaled to a continuous measure of strain along the length of the fiber (Q). The algorithm is then advanced along the length of the fiber incrementally (R) using the feedback values determined in the previous iteration (K, O) to maintain registration between the reference and the measurement data in the temporal and spectral domains.

Figure 23:
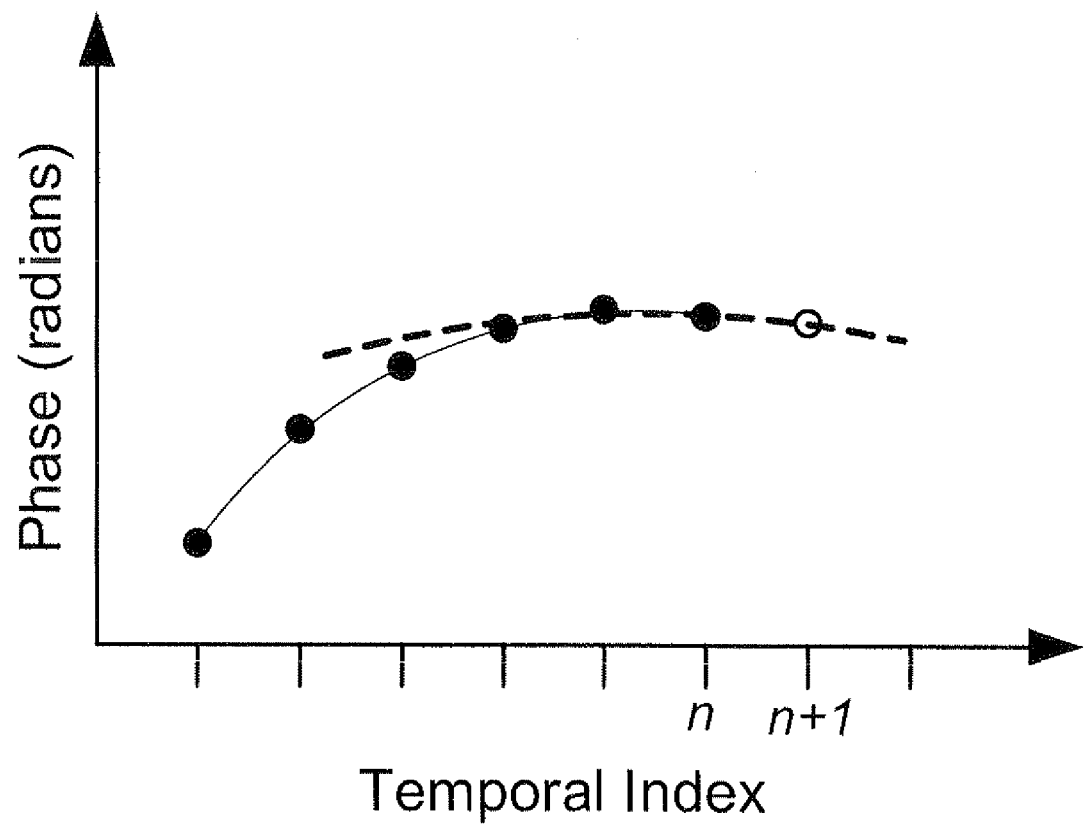
FIG. 23 is a graph illustrating how previous phase values may be used to estimate a required spectral shift for a next iteration.

There are several ways of estimating or directly measuring the spectral and temporal shifts that register the reference and measurement scatter patterns. During the example registration algorithm described above, the quality of the correlation between the two sets may be used as a metric. However, this may be computationally demanding because a search space must be evaluated at each step in the algorithm that is executed. A more computationally efficient algorithm might employ a different method to arrive at these values. Consider the calculation of spectral shift based on the accumulated phase signal in the optical phase tracking algorithm. In some applications, the strain may be assumed continuous along the length of the fiber. As the tracked phase signal is directly related to the strain applied to the fiber, previously-calculated phase values can be fit to estimate the upcoming optical phase value and to scale this phase value to a spectral shift as depicted in the example shown in FIG. 23.

This allows use of simple polynomial fits of previous points to make a good estimate of the upcoming spectral shift. If strain is continuous along the length of the fiber, then the strain cannot change dramatically from index to index, which allows this example implementation to be used in a wide range of strain sensing applications.

Temporal registration may also be maintained with a simple mathematical operation that does not require searching a wide range of temporal shifts. As discussed above, a shift may be induced in one domain by adding a linear phase slope in the transform domain. Consider the converse where a phase slope is achieved in one domain by inducing a shift in the transform domain. This shift may be implemented by any of several means. As one example, the reference and measurement data may be shifted in the spectral domain by multiplying the data sets by a positively rotating complex number and then low pass filtering the dataset. When the reference and measurement are compared in the temporal domain, a slope will have been induced on the phase of the data sets. The original reference and measurement data sets may then be multiplied by a negatively rotating complex number and low pass filtering the datasets. Again, when compared in the temporal domain, the data sets will have an induced phase slope, but this slope will be opposite in sign. Plotting both phase slopes produces a signed indicator of the temporal delay between the two data sets as illustrated in FIG. 24.

The phase of a negatively-shifted (in optical frequency) reference and measurement data set pair is compared to a phase of a positively-shifted reference and measurement data set pair in the temporal domain to provide a measure of temporal delay between the reference and measurement data sets.

Figure 24:
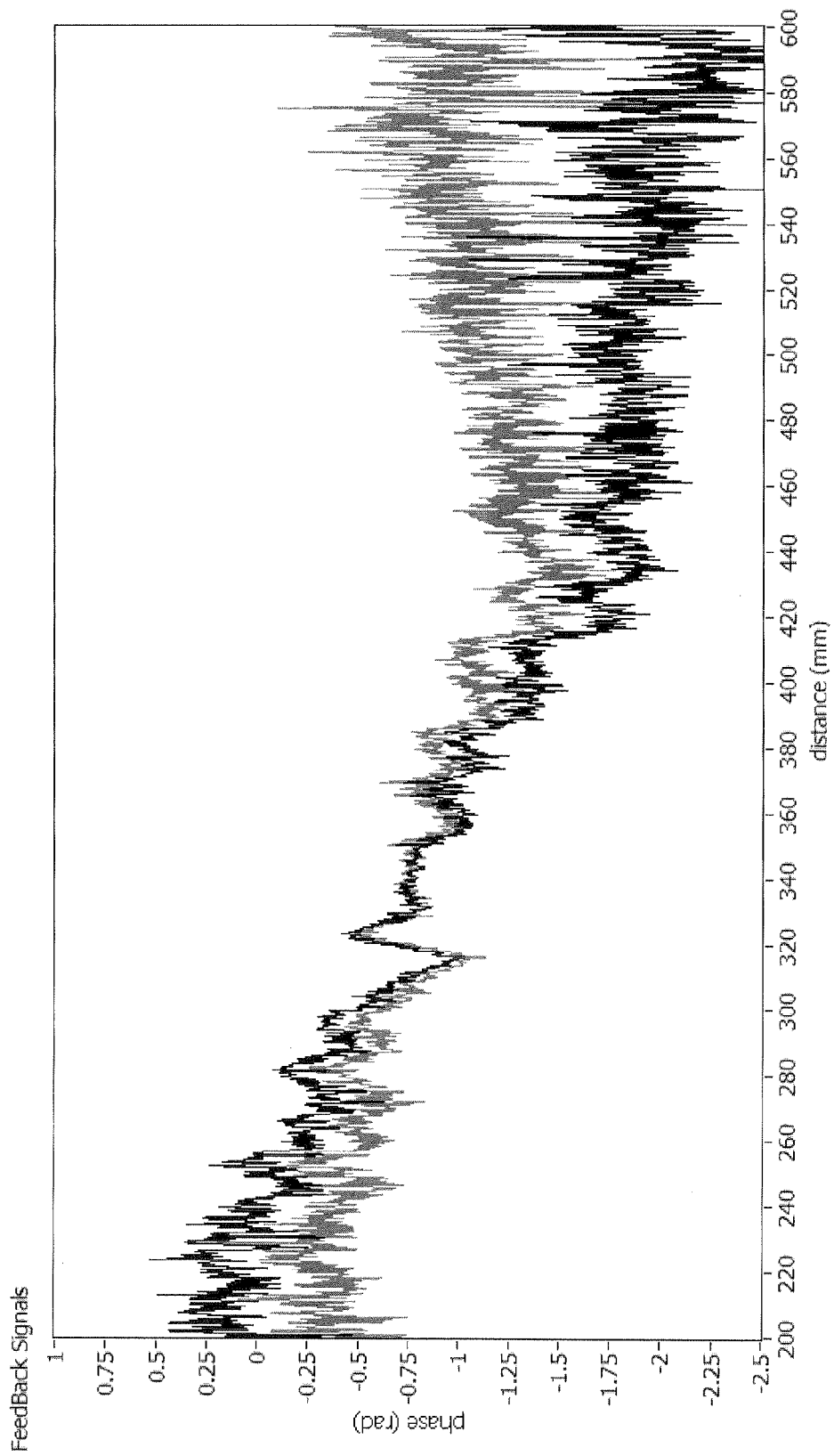
FIG. 24 is a graph illustrating the phase of a negatively, optical frequency-shifted set of reference and measurement data as compared to a phase of a positively, optical frequency-shifted set in the temporal domain to provide a measure of temporal delay between the reference and measurement data sets.

As seen in FIG. 24, the phase of the negatively-shifted (gray) (i.e., shifted in optical frequency) set of reference and measurement pattern data is opposite in slope when compared to the positively-shifted (black) set of reference and measurement pattern data. These phase slopes cross at a distance of 340 millimeters. Delay (a temporal shift) can be scaled, as explained above, to a distance along the length of the fiber by using the distance light travels in a given increment of time. The black curve leads the gray curve before this crossing point, and the gray curve leads the black after this crossing point. Thus, by shifting the data sets both positively and negatively in optical frequency, a signed indicator of temporal delay (either positive or negative) is obtained. This operation may be executed to measure the required temporal shift between two data sets for registration.

The technology described above, such as an extended reference data set and maintaining registration in the spectral and/or temporal domains between a measurement scatter patter and a reference scatter pattern, greatly advances the field of fiber optic strain sensing. The extended reference technology allows strain measurements to be recorded over a spectral range substantially lower than the shifts intended to be measured at higher strains. This allows the design of high-speed systems to be designed as smaller measurement spectral ranges may be used to lower data set sizes, computation requirements, and increase acquisition update rates as measurement time is proportional to the spectral range of the measurement. Further, the extended reference allows use of lower cost light sources in the manufacture of strain sensing systems (laser cost is proportional to functional optical frequency tuning range of the light source). The extended reference technology also enables sensing at greater distances along the length of a fiber while maintaining the ability to measure high strains. As the spatial resolution of the measurement is inversely proportional to the spectral range of the measurement, scans that tune over a smaller wavelength range can sense greater distances along the fiber with the same number of acquired points. Higher strains induce substantial physical deformation of the fiber which reduces the signal-to-noise when comparing a reference pattern to a measurement pattern. However, maintaining registration in the temporal domain increases signal levels and allows for the design of field-robust sensing systems. Both the extended reference and the registration techniques may be used in conjunction with optical phase tracking to provide a continuous, high spatial resolution measurement of strain. These techniques enable robust, low cost strain sensing systems to be manufactured that exceed the strain level measurement capabilities of conventional strain sensing systems.

Although the examples above are directed to multi-core fibers, the technology also may be applied to other structures, e.g., optical waveguides in an optical chip, free-space optical beams probing the same object, etc. Although the OFDR measurement is described in terms of Rayleigh scatter pattern data, Bragg grating interferometric data may also be used.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An interferometric measurement system for measuring a parameter using at least one optical waveguide, comprising:
   a memory configured to store reference interferometric pattern data associated with a segment of the optical waveguide;
   interferometric detection circuitry configured to detect and store measurement interferometric pattern data associated with the segment of the optical waveguide during a measurement operation,
   wherein a spectral range of the reference interferometric pattern of the optical waveguide is greater than a spectral range of the measurement interferometric pattern of the optical waveguide; and
   processing circuitry configured to shift one or both of the measurement interferometric pattern data and the reference interferometric pattern data relative to the other to obtain a match and to use the match to measure the parameter.

2. The apparatus in claim 1, wherein the reference segment data extends further in the spectral domain and the temporal domain than the measurement segment data.

3. The apparatus in claim 1, wherein the interferometric pattern data corresponds to a Rayleigh scatter pattern in the optical waveguide, the parameter corresponds to strain, and the processing circuitry is configured to determine a spectral shift of the spectrum of the Rayleigh scatter in the optical waveguide segment to measure the strain.

4. The apparatus in claim 1, wherein the interferometric pattern data corresponds to a Rayleigh scatter pattern in the optical waveguide, the parameter corresponds to strain, and the processing circuitry is configured to determine a temporal shift of the spectrum of the Rayleigh scatter in the optical waveguide to measure the strain.

5. The apparatus in claim 1, wherein the shift of one or both of the measurement interferometric pattern data and the reference interferometric pattern data allows a match to be detected if the measurement interferometric pattern is shifted beyond a spectral range of measurement associated with the measurement operation.

6. The apparatus in claim 1, wherein the processing circuitry is configured to determine a spectral shift required to find a match of the measurement interferometric pattern data within the reference interferometric pattern data, the determined spectral shift corresponding to a strain applied to the segment.

7. The apparatus in claim 1, wherein the processing circuitry is configured to search for a match of the measurement interferometric pattern data within the reference interferometric pattern data to achieve spectral registration between them, and wherein the match includes an exact match, a closest match, or a matching value that exceeds a predetermined matching threshold.

8. The apparatus in claim 1, wherein the processing circuitry is configured to determine a temporal shift required to find a match of the measurement interferometric pattern data within the reference interferometric pattern data, the determined temporal shift corresponding to a strain applied to the segment.

9. The apparatus in claim 1, wherein the processing circuitry is configured to search for a match of the measurement interferometric pattern data within the reference interferometric pattern data to achieve temporal registration between them, and wherein the match includes an exact match, a closest match, or a matching value that exceeds a predetermined matching threshold.

10. The apparatus in claim 1, wherein the processing circuitry is configured to incrementally, mathematically shift one or both of the measurement interferometric pattern data or the reference interferometric pattern data and to compare the shifted measurement interferometric pattern data against the reference interferometric pattern data at each shift to produce a correlation quality value between the reference interferometric pattern data and the measurement interferometric pattern data.

11. The apparatus in claim 10, wherein the apparatus corresponds to an optical strain sensing system configured to use Optical Frequency Domain Reflectometry (OFDR), wherein the stored reference interferometric pattern data includes OFDR scatter pattern data for the optical waveguide in a baseline state, and wherein the processing circuitry is configured to compare a subsequent OFDR measurement of scatter pattern data for the optical waveguide in a strained state to the reference scatter pattern data to determine a measure of shift in delay of scatters along the segment of the optical waveguide.

12. The apparatus in claim 11, wherein the measured shift in delay corresponds to a continuous, varying optical phase signal when compared against the reference scatter pattern data, and wherein the processing circuitry is configured to determine a derivative of the optical phase signal, the derivative of the optical phase signal corresponding to a change in physical length of the segment of the optical waveguide, and to scale the change in physical length to produce a continuous measurement of strain along the optical waveguide.

13. The apparatus in claim 12, wherein the measurement interferometric pattern data in the temporal domain describes physical locations of scattering events in the optical waveguide segment and the measurement interferometric pattern data transformed into the spectral domain describes an optical frequency response associated with the optical waveguide segment, and wherein the processing circuitry is configured to determine a strain response of the optical fiber segment by correlating the measurement interferometric pattern data in the spectral domain with the reference interferometric pattern data in the spectral domain and to determine a physical displacement of the optical waveguide segment by correlating the measurement interferometric pattern data in the temporal domain with the reference interferometric pattern data in the temporal domain.

14. The apparatus in claim 1, wherein the processing circuitry is configured to perform pattern data registration by systematically shifting one or both of the measurement interferometric pattern data and the reference interferometric pattern data in both a spectral domain and a temporal domain, performing a correlation between the measurement interferometric pattern data and the reference interferometric pattern data, and generating a quality factor based on the correlation at each shift.

15. The apparatus in claim 14, wherein the processing circuitry is configured to multiply the measurement interferometric pattern data or the reference interferometric pattern data by a phase slope in the temporal domain to shift the measurement interferometric pattern data or the reference interferometric pattern data in the spectral domain and to multiply the measurement interferometric pattern data or the reference interferometric pattern data by a phase slope in the spectral domain to shift the measurement interferometric pattern data or the reference interferometric pattern data in the temporal domain.

16. The apparatus in claim 15, wherein the quality factor increases when an average difference between the reference interferometric pattern data and the measurement interferometric pattern data moves closer to zero, and wherein the processing circuitry is configured to select a temporal shift and a spectral shift combination that produces a correlation associated with a highest quality factor.

17. The apparatus in claim 1, wherein the processing circuitry is configured to use the shift of one or both of the measurement interferometric pattern data and the reference interferometric pattern data to prevent a signal-to-noise ratio quality reduction that would otherwise occur when the measurement interferometric pattern data is shifted partially or beyond a spectral range of measurement for the segment.

18. An interferometric measurement method for measuring a parameter associated with at least one optical waveguide, comprising:
   storing in a memory reference interferometric pattern data associated with a segment of the optical waveguide;
   detecting measurement interferometric pattern data associated with the optical waveguide segment during a measurement operation,
   wherein a spectral range of the reference interferometric pattern of the optical waveguide is greater than a spectral range of the measurement interferometric pattern of the optical waveguide;
   shifting by a computer one or both of the measurement interferometric pattern data and the reference interferometric pattern data relative to the other to obtain a match; and
   determining a measurement of the parameter based on the match.

19. The method in claim 18, wherein the reference segment data extends further in the spectral domain and the temporal domain than the measurement segment data.

20. The method in claim 18, wherein the interferometric pattern data corresponds to a Rayleigh scatter pattern in the optical waveguide and the parameter corresponds to strain, the method further comprising:
   determining a spectral shift of the spectrum of the Rayleigh scatter in the optical waveguide segment, and
   measuring the strain based on the determined spectral shift.

21. The method in claim 18, wherein the interferometric pattern data corresponds to a Rayleigh scatter pattern in the optical waveguide, the parameter corresponds to strain, the method further comprising:
determining a temporal shift of the spectrum of the Rayleigh scatter in the optical waveguide to measure the strain.

22. The method in claim 18, wherein the shift of one or both of the measurement interferometric pattern data and the reference interferometric pattern data allows a match to be detected if the measurement interferometric pattern is shifted beyond a spectral range of measurement associated with the measurement operation.

23. The method in claim 18, further comprising:
determining a spectral shift required to find a match of the measurement interferometric pattern data within the reference interferometric pattern data, the determined spectral shift corresponding to a strain applied to the segment.

24. The method in claim 18, further comprising:
searching for a match of the measurement interferometric pattern data within the reference interferometric pattern data to achieve spectral registration between them,
wherein the match includes an exact match, a closest match, or a matching value that exceeds a predetermined matching threshold.

25. The method in claim 18, further comprising:
searching for a match of the measurement interferometric pattern data within the reference interferometric pattern data to achieve temporal registration between them,
wherein the match includes an exact match, a closest match, or a matching value that exceeds a predetermined matching threshold.

26. The method in claim 18, further comprising:
incrementally shifting one or both of the measurement interferometric pattern data or the reference interferometric pattern data, and
comparing the shifted measurement interferometric pattern data against the reference interferometric pattern data at each shift to produce a correlation quality value between the reference interferometric pattern data and the measurement interferometric pattern data.

27. The method in claim 18, wherein the method uses Optical Frequency Domain Reflectometry (OFDR), and wherein the stored reference interferometric pattern data includes OFDR scatter pattern data for the optical waveguide in a baseline state, the method further comprising:
comparing a subsequent OFDR measurement of scatter pattern data for the optical waveguide in a strained state to the reference scatter pattern data, and
determining a measure of shift in delay of scatters along the segment of the optical waveguide based on the comparison.

28. The method in claim 27, wherein the measured shift in delay corresponds to a continuous, varying optical phase signal when compared against the reference scatter pattern data, and wherein the method further comprises:
determining a derivative of the optical phase signal, the derivative of the optical phase signal corresponding to a change in physical length of the segment of the optical waveguide, and
scaling the change in physical length to produce a continuous measurement of strain along the optical waveguide.

29. The method in claim 28, wherein the measurement interferometric pattern data in the temporal domain describes physical locations of scattering events in the optical waveguide segment and the measurement interferometric pattern data transformed into the spectral domain describes an optical frequency response associated with the optical waveguide segment, the method further comprising:
determining a strain response of the optical fiber segment by correlating the measurement interferometric pattern data in the spectral domain with the reference interferometric pattern data in the spectral domain, and
determining a physical displacement of the optical waveguide segment by correlating the measurement interferometric pattern data in the temporal domain with the reference interferometric pattern data in the temporal domain.

30. The method in claim 18, further comprising:
performing pattern data registration by systematically shifting one or both of the measurement interferometric pattern data and the reference interferometric pattern data in both a spectral domain and a temporal domain,
correlating the measurement interferometric pattern data the reference interferometric pattern data, and
generating a quality factor based on the correlation at each shift.

31. The method in claim 30, further comprising:
multiplying the measurement interferometric pattern data or the reference interferometric pattern data by a phase slope in the temporal domain to shift the measurement interferometric pattern data or the reference interferometric pattern data in the spectral domain, and
multiplying the measurement interferometric pattern data or the reference interferometric pattern data by a phase slope in the spectral domain to shift the measurement interferometric pattern data or the reference interferometric pattern data in the temporal domain.

32. The method in claim 31, wherein the quality factor increases when an average difference between the reference interferometric pattern data and the measurement interferometric pattern data moves closer to zero, the method further comprising:
selecting a temporal shift and a spectral shift combination that produces a correlation associated with a highest quality factor.

33. The method in claim 18, further comprising:
using the shift of one or both of the measurement interferometric pattern data and the reference interferometric pattern data to prevent a signal-to-noise ratio quality reduction that would otherwise occur when the measurement interferometric pattern data is shifted partially or beyond a spectral range of measurement for the segment.

34. The method in claim 18, further comprising:
reducing the spectral range of the measurement segment to enable sensing of the parameter at a length along the optical waveguide on the order of or greater than 100 meters.

35. A non-transitory, computer-readable storage medium for use in an interferometric measurement system having an optical waveguide, the non-transitory, computer-readable storage medium storing a computer program comprising instructions that cause a computer-based interferometric measurement system to perform the following tasks:
storing in a memory reference interferometric pattern data associated with a segment of the optical waveguide;
detecting measurement interferometric pattern data associated with the optical waveguide segment during a measurement operation, wherein a spectral range of the reference interferometric pattern of the optical waveguide is greater than a spectral range of the measurement interferometric pattern of the optical waveguide;

shifting by a computer one or both of the measurement interferometric pattern data and the reference interferometric pattern data relative to the other to obtain a match; and determining a measurement of a parameter based on the match.

* * * * *